US012243429B2

(12) United States Patent
Merwaday et al.

(10) Patent No.: US 12,243,429 B2
(45) Date of Patent: Mar. 4, 2025

(54) COOPERATIVE ADAPTIVE CRUISE CONTROL (CACC) SYSTEM FOR CONTROL OF CONNECTED AND AUTONOMOUS VEHICLE (CAV) PLATOONS

(71) Applicant: Intel Corporation, Santa Clara, CA (US)

(72) Inventors: Arvind Merwaday, Hillsboro, OR (US); Leonardo Gomes Baltar, Munich (DE); Kathiravetpillai Sivanesan, Portland, OR (US); May Wu, Portland, OR (US); Suman A. Sehra, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 794 days.

(21) Appl. No.: 17/306,449

(22) Filed: May 3, 2021

(65) Prior Publication Data

US 2021/0264794 A1 Aug. 26, 2021

(51) Int. Cl.
*G08G 1/00* (2006.01)
*B60W 30/09* (2012.01)
*B60W 30/16* (2020.01)

(52) U.S. Cl.
CPC .............. *G08G 1/22* (2013.01); *B60W 30/09* (2013.01); *B60W 30/16* (2013.01); *B60W 2510/0638* (2013.01); *B60W 2510/0666* (2013.01); *B60W 2510/12* (2013.01); *B60W 2530/10* (2013.01); *B60W 2530/20* (2013.01); *B60W 2554/4042* (2020.02); *B60W 2554/801* (2020.02);

(Continued)

(58) Field of Classification Search
CPC ........ G08G 1/22; B60W 30/09; B60W 30/16; B60W 2510/0638; B60W 2510/0666; B60W 2510/12; B60W 2530/10; B60W 2530/20; B60W 2554/4042; B60W 2554/801; B60W 2554/802; B60W 2556/45; B60W 2754/20; B60W 2754/30; H04W 4/023; H04W 4/90; H04W 4/46
USPC ......................................................... 701/96
See application file for complete search history.

(56) References Cited

U.S. PATENT DOCUMENTS

2010/0256852 A1* 10/2010 Mudalige ................. G08G 1/22
701/24
2013/0279393 A1* 10/2013 Rubin ............... H04W 56/0035
370/312

(Continued)

OTHER PUBLICATIONS

M. Segata, "Safe and Efficient Communication Protocols for Platooning Control," 2016.

(Continued)

*Primary Examiner* — Muhammad Shafi
(74) *Attorney, Agent, or Firm* — Banner & Witcoff Ltd.

(57) ABSTRACT

Techniques are disclosed to increase the safety of vehicles travelling in a vehicle platoon. These techniques include the utilization of a comprehensive safety framework such as a safety driving model (SDM) for the platoon control systems. In contrast to the conventional approaches, the use of the SDM model allows for platoon vehicle control systems to consider the acceleration/deceleration capabilities of the vehicles to calculate minimum safe longitudinal distances between the platoon vehicles. The disclosed techniques may utilize the periodicity of platoon messages as well as other parameters to improve upon platoon vehicle control and safety.

11 Claims, 14 Drawing Sheets

(52) U.S. Cl.
CPC ... *B60W 2554/802* (2020.02); *B60W 2556/45* (2020.02); *B60W 2754/20* (2020.02); *B60W 2754/30* (2020.02)

(56) References Cited

U.S. PATENT DOCUMENTS

| | | | |
|---|---|---|---|
| 2020/0017108 A1* | 1/2020 | Bae | G08G 1/096708 |
| 2020/0210726 A1* | 7/2020 | Yang | G06N 3/08 |
| 2021/0043090 A1* | 2/2021 | Park | H04W 36/322 |

OTHER PUBLICATIONS

R. Rajamani, Vehicle Dynamics and Control, Springer, 2012.
S. E. Shladover, "PATH at 20—History and Major Milestones," IEEE Transactions on Intelligent Transportation Systems, vol. 8, No. 4, pp. 584-592, Dec. 2007.
T. Robinson, E. Chan and E. Coelingh, "Operating platoons on public motorways: an introduction to the sartre platooning programme," in World Congress on Intelligent Transport Systems, 2010.
S. Shalev-Shwartz, S. Shammah and A. Shashua, "On a Formal Model of Safe and Scalable Self-driving Cars," arXiv.borg, vol. v6, 2018.
J. Ploeg, B. T. M. Scheepers, E. v. Nunen, N. v. d. Wouw and H. Nijmeijer, "Design and experimental evaluation of cooperative adaptive cruise control," in International IEEE Conference on Intelligent Transportation Systems (ITSC), Washington, DC, USA, 2011.
J. Ploeg, E. Semsar-Kazerooni, G. Lijster, N. van de Wouw and H. Nijmeijer, "Graceful degradation of CACC performance subject to unreliable wireless communication," in IEEE Conference on Intelligent Transportation Systems (ITSC), The Hague, Netherlands, 2013.
U.S. Appl. No. 17/132,578, filed Dec. 23, 2020.

* cited by examiner

COOPERATIVE ADAPTIVE CRUISE CONTROL (CACC) SYSTEM FOR CONTROL OF CONNECTED AND AUTONOMOUS VEHICLE (CAV) PLATOONS

TECHNICAL FIELD

The disclosure described herein generally relates to enhancing safety for vehicles travelling in, joining, and/or exiting a vehicle platoon.

BACKGROUND

Vehicle platooning or flocking is a method for driving a group of vehicles together, and is meant to increase the capacity of roads via the use of an automated highway system. So called "smart" vehicles with artificial intelligence and/or advanced driving assistance (ADAS) systems may automatically or semi-automatically join and leave such platoons, as well as organize themselves within such platoons, which typically include 8 to 25 vehicles. Such vehicle platoons have advantages as the distances between cars or trucks within platoons may be decreased using electronic and possibly mechanical coupling. This capability allows many cars or trucks to accelerate or brake simultaneously, and may also allow for a closer headway between vehicles by eliminating reacting distance needed for human reaction. However, current vehicle platooning techniques have various drawbacks.

BRIEF DESCRIPTION OF THE DRAWINGS/FIGURES

The accompanying drawings, which are incorporated herein and form a part of the specification, illustrate the present disclosure and, together with the description, further serve to explain the principles and to enable a person skilled in the pertinent art to make and use the techniques discussed herein.

In the drawings, like reference characters generally refer to the same parts throughout the different views. The drawings are not necessarily to scale, emphasis instead generally being placed upon illustrating the principles of the disclosure. In the following description, reference is made to the following drawings, in which.

The present disclosure will be described with reference to the accompanying drawings. The drawing in which an element first appears is typically indicated by the leftmost digit(s) in the corresponding reference number.

DETAILED DESCRIPTION

Figure 1:
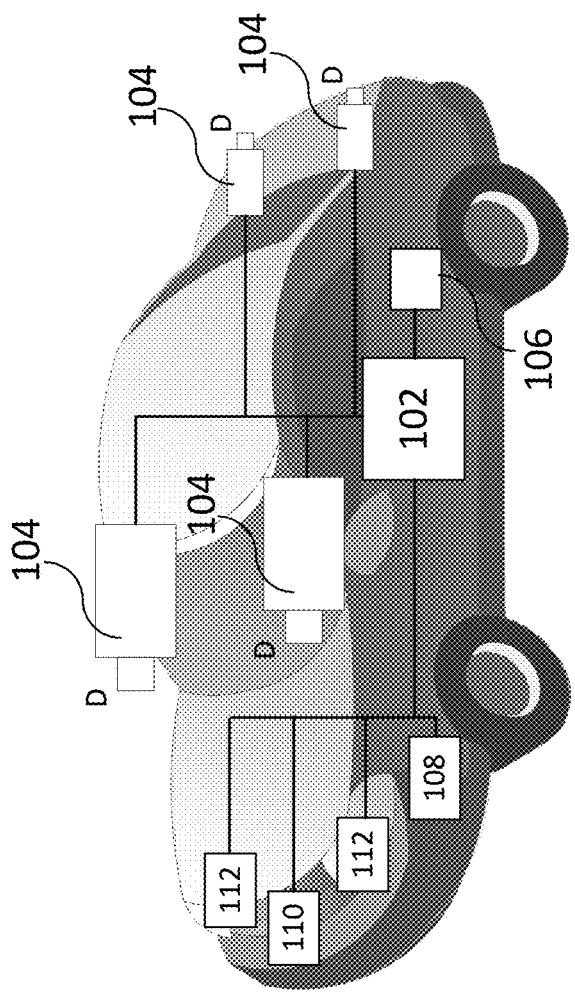
FIG. 1 illustrates a vehicle in accordance with the present disclosure.

The following detailed description refers to the accompanying drawings that show, by way of illustration, exemplary details in which the disclosure may be practiced. In the following description, numerous specific details are set forth in order to provide a thorough understanding of the present disclosure. However, it will be apparent to those skilled in the art that the various designs, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring the disclosure.

Connected and Autonomous Vehicle (CAV) platooning is one means by which vehicle platooning communication, organization, and operation is accomplished. Thus, in CAV the joint design of control and communication systems plays a central role in enabling what are referred to as "platoon vehicles" to travel closely and safely at high speeds. An important concept in CAV platooning operation and control is the calculation and execution of safe distances to be maintained between the vehicles within the vehicle platoon. These considerations include the calculation of a safe inter-vehicle longitudinal distance between adjacent vehicles in the platoon, as well as the determination of a safe lateral distance between platoon vehicles in adjacent lanes when a vehicle platoon spans multiple lanes.

Conventional techniques to identify the longitudinal control of platoon vehicles include the use of a Cooperative Adaptive Cruise Control (CACC) system. Such conventional approaches of utilizing CACC controller designs have been used in projects such as California PATH, SARTRE, etc., in which the CACC controller exploits the data received by a leader vehicle (i.e. the frontmost vehicle) and the immediate front vehicle (i.e. with respect to a vehicle in the vehicle platoon not including the frontmost vehicle). This variant of CACC controller design provides string stability with a constant inter-vehicle spacing policy. However, such designs do not consider the periodicity and/or frequency of the platoon messages communicated between the platoon vehicles, which may impact the response time required by a following vehicle and thus potentially jeopardize the safety of platoon vehicles when not considered.

Moreover, some conventional CACC controller designs that aim to ensure the longitudinal safety of platoon vehicles use a constant time headway policy between the platoon vehicles, which increases the inter-vehicle distance as the speed increases to ensure safety. Other conventional CACC designs dynamically adjust the headway time depending on the periodicity of the platoon messages. However, such conventional CACC controllers fail to consider the details of vehicle dynamics such as maximum acceleration, maximum/minimum braking deceleration, etc., of the platoon vehicles. This leads to an unnecessary increase in the inter-vehicle distance, which may lead to inefficient usage of the highways. Further complicating this issue, conventional CACC controller design approaches that implement a constant vehicle spacing policy do not impose any safety-related restrictions on the inter-vehicle distance parameter, and setting this parameter to a small value may be unsafe at higher speeds.

Therefore, to address these shortcomings, the disclosure describes a comprehensive safety framework such as a safety driving model (SDM) for the platoon vehicle control systems. In contrast to the conventional approaches described above, the use of the SDM model allows for platoon vehicle control systems to consider the periodicity of platoon messages to improve upon platoon vehicle control and safety, as the SDM parameters may be calculated using the frequency of platoon messages to determine the minimum safe longitudinal distance, as well as other parameters for vehicles travelling within a platoon. Moreover, the disclosure as discussed in further detail herein may also utilize the acceleration/deceleration capabilities of the vehicles to calculate minimum safe longitudinal distance between the platoon vehicles.

The Safety Driving Model (SDM)

The SDM functions to provide a mathematical framework that aims to ensure safety assurance of autonomous vehicles (AVs) and/or any suitable type of vehicle that implements at least some form of an autonomously-executed action or control without human assistance (fully-autonomous control functions, semi-autonomous control functions, etc.). Thus, the SDM is a comprehensive framework that was developed to ensure both longitudinal and lateral safety of vehicles (such as AVs) in various types of scenarios. The SDM (also referred to as a "driving policy model" or simply as a "driving model"), may be implemented as part of a fully or semi-autonomous vehicle control system, such as an advanced driving assistance (ADAS) system and/or a driving assistance and automated driving system.

A SDM may thus be represented as any suitable number of SDM parameters, any suitable subset of which being related as part of a mathematical model formalizing an interpretation of applicable laws, standards, policies, etc., which are applicable to self-driving (such as ground) vehicles and/or other suitable types of vehicles that may implement fully autonomous or semi-autonomous functions and which may utilize tools such as the aforementioned adaptive cruise control, automated braking or steering, etc. For instance, a SDM may be designed to achieve three goals: first, the interpretation of the law should be sound in the sense that it complies with how humans interpret the law; second, the interpretation should lead to a useful driving policy, meaning it will lead to an agile driving policy rather than an overly-defensive driving which inevitably would confuse other human drivers and will block traffic, and in turn limit the scalability of system deployment; and third, the interpretation should be efficiently verifiable in the sense that it can be rigorously proven that the self-driving (autonomous) vehicle correctly implements the interpretation of the law. An implementation in a host vehicle of a SDM, illustratively, may be or include an implementation of a mathematical model for safety assurance that enables identification and performance of proper responses to dangerous situations such that self-perpetrated accidents can be avoided.

A SDM may implement logic that is applied to the SDM parameters to apply driving behavior rules such as the following five rules, for instance:

Do not hit someone from behind.
Do not cut-in recklessly.
Right-of-way is given, not taken.
Be careful of areas with limited visibility.
If you can avoid an accident without causing another one, you must do it.

It is to be noted that these rules are not limiting and not exclusive, and can be amended in various designs as desired. The rules rather represent a social driving contract that might be different depending on the region, and may also develop over time. While these five rules are currently applicable in most of the countries, they might not be complete and may be amended.

Although vehicles may rely on an SDM to perform various driving functions, there are issues in the implementation of the SDM for vehicle platooning scenarios because the SDM may not explicitly consider coordination among the other platoon vehicles (such as the CAVs) via wireless communications. Thus, the disclosure described herein functions to enable a vehicle to implement an SDM model via its various control systems (such as its CACC controller and/or other controller systems implemented by the vehicle), to ensure the safety of platoon vehicles. The disclosure as described herein also includes extending the use of the SDM to the lateral control systems of the platoon vehicles.

The disclosure as described herein are not limited to implementation within autonomous or semi-autonomous vehicles. The designs described herein may be implemented as part of any suitable type of vehicle that may be capable of joining a vehicle platoon, travelling within a vehicle platoon, and/or leaving such a vehicle platoon. Therefore, one or more of the various vehicle components such as those discussed herein with reference to FIG. 2 for instance, may be implemented as part of a standard vehicle (i.e. a vehicle not using autonomous driving functions), a fully autonomous vehicle, and/or a semi-autonomous vehicle, in various designs.

Vehicle and Accompanying Safety System

FIG. 1 shows a vehicle 100 including a safety system 200 (see also FIG. 2) in accordance with the present disclosure. The vehicle 100 and the safety system 200 are exemplary in nature, and may thus be simplified for explanatory purposes. Locations of elements and relational distances (as discussed above, the Figures are not to scale) and are provided as non-limiting instances. The safety system 200 may include various components depending on the requirements of a particular implementation and/or application.

Figure 2:
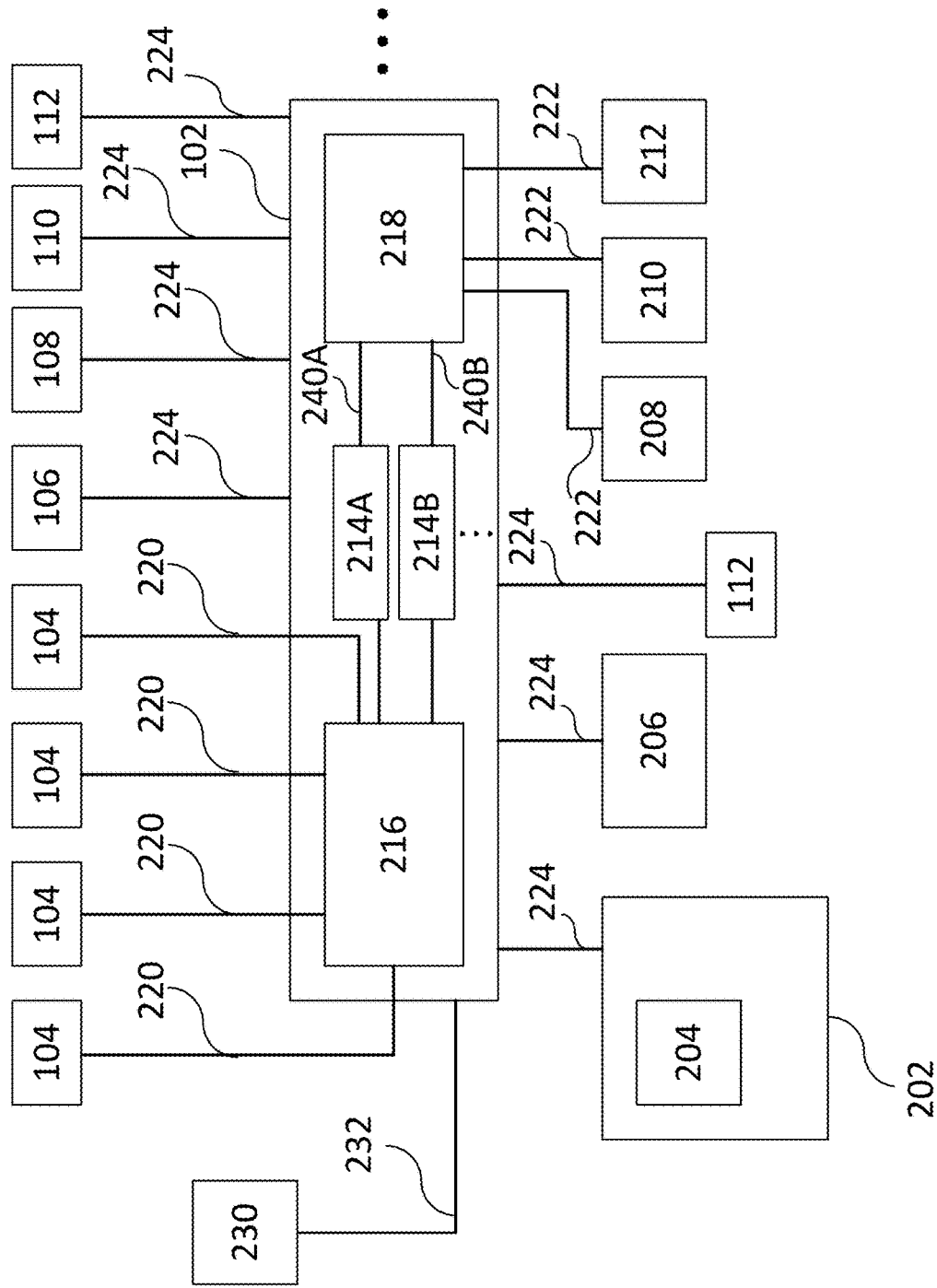
FIG. 2 illustrates various electronic components of a safety system of a vehicle in accordance with the present disclosure.

As shown in FIG. 1 and FIG. 2, the safety system 200 may include one or more processors 102, one or more image acquisition devices 104 such as one or more cameras, one or more position sensors 106 such as a Global Navigation Satellite System (GNSS), a Global Positioning System (GPS), one or more memories 202, one or more map databases 204, one or more user interfaces 206 (such as a display, a touch screen, a microphone, a loudspeaker, one or more buttons and/or switches, and the like), and one or more wireless transceivers 208, 210, 212.

The wireless transceivers 208, 210, 212 may be configured to operate in accordance with any suitable number and/or type of desired radio communication protocols or standards. A wireless transceiver (a first wireless transceiver 208) may be configured in accordance with a Short Range mobile radio communication standard such as Bluetooth, Zigbee, and the like. A wireless transceiver (a second wireless transceiver 210) may be configured in accordance with a Medium or Wide Range mobile radio communication standard such as a 3G (Universal Mobile Telecommunications System—UMTS), a 4G (Long Term Evolution—LTE), or a 5G mobile radio communication standard in accordance with corresponding 3GPP (3rd Generation Partnership Project) standards, the most recent version at the time of this writing being the 3GPP Release 16 (2020).

A wireless transceiver (a third wireless transceiver 212) may be configured in accordance with a Wireless Local Area Network communication protocol or standard such as in accordance with IEEE 802.11 Working Group Standards, the most recent version at the time of this writing being IEEE Std 802.11™-2020, published Feb. 26, 2021 (such as 802.11, 802.11a, 802.11b, 802.11g, 802.11n, 802.11p, 802.11-12, 802.11ac, 802.11ad, 802.11ah, 802.11ax, 802.1 lay, and the like). The one or more wireless transceivers 208, 210, 212 may be configured to transmit signals via an antenna system (not shown) using an air interface. One or more of the transceivers 208, 210, 212 may be configured to implement one or more vehicle to everything (V2X) communication protocols, which may include vehicle to vehicle (V2V), vehicle to infrastructure (V2I), vehicle to network (V2N), vehicle to pedestrian (V2P), vehicle to device (V2D), vehicle to grid (V2G), and any other suitable communication protocols.

The one or more processors 102 may implement any suitable type of processing circuitry and architecture, and may be configured as a controller implemented by the vehicle 100 to perform various vehicle control functions. The one or more processors 102 may be configured to function as a controller for the vehicle 100 to analyze sensor data and received communications, to calculate specific actions for the vehicle 100 to execute, and to cause the corresponding action to be executed, which may be in accordance with an AV or ADAS system, for instance.

The one or more processors 102 may include one or more application processors 214A, 214B, an image processor 216, a communication processor 218, and additionally or alternatively may include any other suitable processing device not shown in the Figures. Similarly, image acquisition devices 104 may include any suitable number of image acquisition devices and components depending on the requirements of a particular application. Image acquisition devices 104 may include one or more image capture devices (such as cameras, charge coupling devices (CCDs), or any other type of image sensor). The safety system 200 may also include a data interface communicatively connecting the one or more processors 102 to the one or more image acquisition devices 104. A first data interface may include any wired and/or wireless first link 220, or first links 220 for transmitting image data acquired by the one or more image acquisition devices 104 to the one or more processors 102, such as to the image processor 216.

The wireless transceivers 208, 210, 212 may be coupled to the one or more processors 102, such as to the communication processor 218 via a second data interface. The second data interface may include any wired and/or wireless second link 222 or second links 222 for transmitting radio transmitted data acquired by wireless transceivers 208, 210, 212 to the one or more processors 102, such as to the communication processor 218. Such transmissions may also include communications (one-way or two-way) between the vehicle 100 and one or more other (target) vehicles in an environment of the vehicle 100 (such as to facilitate coordination of navigation of the vehicle 100 in view of or together with other (target) vehicles in the environment of the vehicle 100), or even a broadcast transmission to unspecified recipients in a vicinity of the transmitting vehicle 100. These communications may include platoon messages and/or control messages that are transmitted between the vehicles while traveling together in a platoon, while the platoon vehicles are organizing within a vehicle platoon, messages between vehicles joining or exiting a platoon, etc.

The memories 202 as well as the one or more user interfaces 206 may be coupled to each of the one or more processors 102, via a third data interface. The third data interface may include any wired and/or wireless third link 224 or third links 224. Furthermore, the position sensor 106 may be coupled to each of the one or more processors 102, via the third data interface.

Each processor 214A, 214B, 216, 218 of the one or more processors 102 may be implemented as any suitable number and/or type of hardware-based processing devices (processing circuitry), and may collectively, i.e. with the one or more processors 102, form one or more type of controllers as discussed herein. The architecture shown in FIG. 2 is provided for ease of explanation, and the vehicle 100 may include any suitable number of the one or more processors 102, each of which may be similarly configured to utilize data received via the various interfaces and perform a specific task.

The one or more processors 102 may form a CACC controller that is configured to perform the CACC-based tasks as discussed further herein, such as the calculation and execution of minimum safe longitudinal distances for vehicles travelling within a platoon for instance. The vehicle 100 may, additionally or alternatively to the one or more processors 102, implement other processors (not shown) that may form a different type of controller that is configured to perform other types of tasks as discussed further herein, such as the calculation and execution of minimum safe lateral distances for vehicles travelling within a platoon for instance. Each controller may receive data from respectively coupled components as shown in FIG. 2 via respective interfaces (220, 222, 224, 232, etc.), with the wireless transceivers 208, 210, and/or 212 providing data to the respective controller via the second links 222, which function as communication interfaces between the respective wireless transceivers 208, 210, and/or 212 and each respective controller.

The application processors 214A, 214B may individually represent respective controllers that work in conjunction with the one or more processors 102 to perform specific controller-related tasks. For instance, the application processor 214A may be implemented as a CACC controller, whereas the application processor 214B may be implemented as a different type of controller that is configured to perform other types of tasks as discussed further herein, such as a lateral controller configured to perform the calculation and execution of lateral control maneuvers to maintain minimum safe lateral distances for vehicles travelling within a platoon. The one or more processors 102 may receive data from respectively coupled components as shown in FIG. 2 via the various interfaces 220, 222, 224, 232, etc., and the communication processor 218 may provide communication data received from other vehicles (or to be transmitted to other vehicles) to each controller via the respectively coupled links 240A, 240B, which function as communication interfaces between the respective application processors 214A, 214B and the communication processors 218.

The one or more processors 102 may additionally be implemented to communicate with any other suitable components of the vehicle 100 to determine a state of the vehicle while driving or at any other suitable time. For instance, the vehicle 100 may include one or more vehicle computers, sensors, ECUs, interfaces, etc., which may collectively be referred to as vehicle components 230 as shown in FIG. 2. The one or more processors 102 are configured to communicate with the vehicle components 230 via an additional data interface 232, which may represent any suitable type of links and operate in accordance with any suitable communication protocol (such as CAN bus communications). Using the data received via the data interface 232, the one or more processors 102 may determine any suitable type of vehicle status information (vehicle data) such as the current drive gear, current engine speed, acceleration capabilities of the vehicle 100, etc. The one or more processors 102 (functioning as a CACC controller) may utilize the data received via the vehicle components 232, which may include kinematic parameters, to calculate a dynamic kinematics model associated with movement of the vehicle 100 in accordance with a set of kinematic parameters including engine power, engine speed, engine efficiency, a differential gear ratio, a diameter of tractive wheels, vehicle mass, etc. The use of these kinematic parameters and the resulting model is further discussed below.

In any event, the one or more processors may include any suitable number of other processors 214A, 214B, 216, 218, each of which may comprise a sub-processor and/or include a microprocessor, pre-processors (such as an image pre-processor), graphics processors, a central processing unit (CPU), support circuits, digital signal processors, integrated circuits, memory, or any other types of devices suitable for running applications and for data processing (image processing, audio processing, etc.) and analysis and/or to enable vehicle control to be functionally realized. Each processor 214A, 214B, 216, 218 may include any suitable type of single or multi-core processor, mobile device microcontroller, central processing unit, etc. These processor types may each include multiple processing units with local memory and instruction sets. Such processors may include video inputs for receiving image data from multiple image sensors, and may also include video out capabilities.

Any of the processors 214A, 214B, 216, 218 disclosed herein may be configured to perform certain functions in accordance with program instructions, which may be stored in a memory of the one or more memories 202. In other words, a memory of the one or more memories 202 may store software that, when executed by a processor (by the one or more processors 102, one or more of the processors 214A, 214B, 216, 218, etc.), controls the operation of the safety system 200. A memory of the one or more memories 202 may store one or more databases and image processing software, as well as a trained system, such as a neural network, or a deep neural network. The one or more memories 202 may include any number of random access memories, read only memories, flash memories, disk drives, optical storage, tape storage, removable storage, or any other suitable types of storage.

The safety system 200 may further include components such as a speed sensor 108 (such as a speedometer) for measuring a speed of the vehicle 100. The safety system may also include one or more accelerometers (either single axis or multiaxis) (not shown) for measuring accelerations of the vehicle 100 along one or more axes. The safety system 200 may further include additional sensors or different sensor types such as an ultrasonic sensor, a thermal sensor, one or more radar sensors 110, one or more LIDAR sensors 112 (which may be integrated in the head lamps of the vehicle 100), digital compasses, and the like. The radar sensors 110 and/or the LIDAR sensors 112 may be configured to provide pre-processed sensor data, such as radar target lists or LIDAR target lists. The third data interface (one or more links 224) may couple the speed sensor 108, the one or more radar sensors 110, and the one or more LIDAR sensors 112 to at least one of the one or more processors 102.

The one or more memories 202 may store data in a database or in any different format, which may indicate a location of known landmarks. The one or more processors 102 may process sensory information (such as images, radar signals, depth information from LIDAR or stereo processing of two or more images) of the environment of the vehicle 100 together with position information, such as a GPS coordinate, a vehicle's ego-motion, etc., to determine a current location and/or orientation of the vehicle 100 relative to the known landmarks and refine the determination of the vehicle's location. Certain designs of this technology may be included in a localization technology such as a mapping and routing model.

The map database 204 may include any suitable type of database storing (digital) map data for the vehicle 100, for the safety system 200. The map database 204 may include data relating to the position, in a reference coordinate system, of various items, including roads, water features, geographic features, businesses, points of interest, restaurants, gas stations, etc. The map database 204 may store not only the locations of such items, but also descriptors relating to those items, including names associated with any of the stored features. A processor of the one or more processors 102 may download information from the map database 204 over a wired or wireless data connection to a communication network (such as over a cellular network and/or the Internet, etc.). In some cases, the map database 204 may store a sparse data model including polynomial representations of certain road features (such as lane markings) or target trajectories for the vehicle 100. The map database 204 may also include stored representations of various recognized landmarks that may be provided to determine or update a known position of the vehicle 100 with respect to a target trajectory. The landmark representations may include data fields such as landmark type, landmark location, among other potential identifiers. The map database 204 can also include non-semantic features including point clouds of certain objects or features in the environment, and feature point and descriptors.

Furthermore, the safety system 200 may implement the aforementioned SDM as part of any suitable type of control system, which may include a CACC controller and/or other suitable controller (such as a lateral distance controller), etc., which may form part of an advanced driving assistance system (ADAS) or a driving assistance and automated driving system. The safety system 200 may include a computer implementation of a formal model such as the SDM. As described above, the vehicle 100 may include the safety system 200 as also described with reference to FIG. 2. The vehicle 100 may include the one or more processors 102, which may be integrated with or separate from an engine control unit (ECU) of the vehicle 100. The safety system 200 may generate data to control or assist to control the ECU and/or other components of the vehicle 100 to directly or indirectly control the driving of the vehicle 100. General Operation of the Vehicle 100 and the Safety System 200

A controller of a first vehicle is provided. With reference to FIGS. 1 and 2, the vehicle controller may include a communication interface configured to periodically receive platoon messages from a second vehicle in a vehicle platoon of the first vehicle and a Cooperative Adaptive Cruise Control (CACC) controller configured to: generate a safety driving model (SDM) for the first vehicle to perform control functions using first vehicle SDM parameters comprising at least a defined safe longitudinal distance between the first vehicle and the second vehicle, determine the safe longitudinal distance using a response time that incorporates a frequency of the platoon messages periodically received from the second vehicle, and cause the first vehicle to use the determined safe longitudinal distance as an inter-vehicle distance between the first vehicle and the second vehicle in the vehicle platoon. Furthermore, the response time may comprise a summation of (i) communication delays of the platoon messages periodically received from the second vehicle, (ii) planning delays for calculating path planning for the first vehicle, and (iii) actuation delays for controlling the first vehicle. In addition or in alternative to and in any combination with the optional features previously explained in this paragraph, the communication interface may be configured to receive the platoon messages in accordance with a vehicle-to-everything (V2X) communication protocol. In addition or in alternative to and in any combination with the optional features previously explained in this paragraph, the CACC controller may be configured to update the SDM when the first vehicle travels in the vehicle platoon with the second vehicle, and to update the safe longitudinal distance between the first vehicle and the second vehicle based on the updated SDM. Moreover, and in addition or in alternative to and in any combination with the optional features previously explained in this paragraph, the communication interface may be configured to transmit one or more further platoon messages containing at least a portion of the first vehicle SDM parameters to the second vehicle to cause the second vehicle to transmit, as part of at least one of the periodically received platoon messages, instructions of an organizational change to the vehicle platoon. Still further, and in addition or in alternative to and in any combination with the optional features previously explained in this paragraph, the platoon messages may comprise second vehicle SDM parameters that are generated and used by the second vehicle to perform control functions, and the CACC controller may be configured to update the SDM for the first vehicle using the second vehicle SDM parameters. Furthermore, and in addition or in alternative to and in any combination with the optional features previously explained in this paragraph, the first vehicle SDM parameters may further comprise a defined safe lateral distance between the first vehicle and a third vehicle in the vehicle platoon parallel with the first vehicle and the second vehicle, and the controller may include a lateral controller configured to utilize the SDM to perform lateral control functions, and to update the first vehicle SDM by determining a safe lateral distance between the first vehicle and the third vehicle based on a frequency of the platoon messages periodically received from the third vehicle. In addition or in alternative to and in any combination with the optional features previously explained in this paragraph, the platoon messages are received from the second vehicle and comprise information of an environment of the vehicle platoon, the communication interface may be further configured to transmit additional platoon messages including information of the environment of the vehicle platoon, the first vehicle may be a last vehicle in the vehicle platoon, and the second vehicle may be a first vehicle in the vehicle platoon. Also, and in addition or in alternative to and in any combination with the optional features previously explained in this paragraph, the platoon messages may be received from the second vehicle including instructions for the first vehicle to execute a predetermined emergency braking maneuver in the vehicle platoon.

A controller of a first vehicle is provided. With reference to FIGS. 1 and 2, the vehicle controller may include a memory configured to store computer-readable instructions; and a Cooperative Adaptive Cruise Control (CACC) controller configured to execute the computer-readable instructions stored in the memory to: generate a safety driving model (SDM) for the first vehicle to perform control functions using first vehicle SDM parameters comprising at least a defined safe longitudinal distance between the first vehicle and a second vehicle in a vehicle platoon of the first vehicle, determine a dynamic kinematics model of movement of the first vehicle, determine an acceleration value of the first vehicle using the dynamic kinematics model, determine the safe longitudinal distance using the acceleration value, and cause the first vehicle to use the determined safe longitudinal distance as an inter-vehicle distance between the first vehicle and the second vehicle in the vehicle platoon. Furthermore, the CACC controller may be configured to determine, as the acceleration value of the first vehicle using the dynamic kinematics model, a maximum acceleration value of the first vehicle, which may be as a function of a currently engaged drive gear of the first vehicle and additionally or alternatively as a further function of a current speed of the first vehicle. In addition or in alternative to and in any combination with the optional features previously explained in this paragraph, the CACC controller may configured to determine the dynamic kinematics model in accordance with a set of kinematic parameters including engine power, engine speed, engine efficiency, a differential gear ratio, a diameter of tractive wheels, and vehicle mass. Moreover, and in addition or in alternative to and in any combination with the optional features previously explained in this paragraph, the CACC controller may be configured to update the SDM when the first vehicle travels in the vehicle platoon with the second vehicle, and to update the determination of the safe longitudinal distance between the first vehicle and the second vehicle using the updated SDM. Still further, and in and in addition or in alternative to and in any combination with the optional features previously explained in this paragraph, the controller may include a communication interface configured to transmit one or more first platoon messages containing at least a portion of the first vehicle SDM parameters to the second vehicle to cause the second vehicle to transmit one or more second platoon messages to the first vehicle containing instructions of an organizational change to the vehicle platoon. In addition or in alternative to and in any combination with the optional features previously explained in this paragraph, the communication interface may be configured to receive one or more platoon messages transmitted by the second vehicle including at least a portion of second vehicle SDM parameters generated and used by the second vehicle to perform control functions, and the CACC controller may be configured to update the SDM for the first vehicle using the portion of the second vehicle SDM parameters. Furthermore, and in addition or in alternative to and in any combination with the optional features previously explained in this paragraph, the first vehicle SDM parameters may comprise a defined safe lateral distance between the first vehicle and a third vehicle in the vehicle platoon parallel with the first vehicle and the second vehicle, and the controller may further include a lateral controller configured to utilize the SDM to perform lateral control functions, and to update the SDM for the first vehicle by calculating a safe lateral distance between the first vehicle and the third vehicle based on the frequency of the platoon messages periodically received from the third vehicle. Further still, and in addition or in alternative to and in any combination with the optional features previously explained in this paragraph, the communication interface may be configured to receive one or more platoon messages transmitted by the second vehicle comprising information of an environment of the vehicle platoon, and to transmit additional platoon messages comprising information of the environment of the vehicle platoon, the first vehicle may be a last vehicle in the vehicle platoon, and the second vehicle may be a first vehicle in the vehicle platoon. Also, and in addition or in alternative to and in any combination with the optional features previously explained in this paragraph, the communication interface may be configured to receive one or more platoon messages transmitted by the second vehicle comprising instructions for the first vehicle to execute a predetermined emergency braking maneuver in the vehicle platoon.

A first vehicle is provided. The first vehicle may include a transceiver configured to periodically receive platoon messages from a second vehicle in a vehicle platoon of the first vehicle; and a controller configured to: generate a safety driving model (SDM) for the first vehicle to perform control functions using first vehicle SDM parameters comprising at least a defined safe longitudinal distance between the first vehicle and the second vehicle, determine the safe longitudinal distance using a response time that incorporates a frequency of the platoon messages periodically received from the second vehicle, and cause the first vehicle to use the determined safe longitudinal distance as an inter-vehicle distance between the first vehicle and the second vehicle in the vehicle platoon. In addition or in alternative to and in any combination with the optional features previously explained in this paragraph, the transceiver may be configured to receive the platoon messages in accordance with a vehicle-to-everything (V2X) communication protocol, and the controller may be configured to update the SDM when the first vehicle travels in the vehicle platoon with the second vehicle, and to update the safe longitudinal distance between the first vehicle and the second vehicle based on the updated SDM.

A first vehicle is provided. The first vehicle may include a data interface configured to receive vehicle data indicative of a status of the first vehicle; and a controller configured to: generate a safety driving model (SDM) for the first vehicle to perform control functions using first vehicle SDM parameters comprising at least a defined safe longitudinal distance between the first vehicle and a second vehicle in a vehicle platoon of the first vehicle, determine a dynamic kinematics model of movement of the first vehicle using the vehicle data, determine an acceleration value of the first vehicle using the dynamic kinematics model, determine the safe longitudinal distance using the acceleration value, and cause the first vehicle to use the determined safe longitudinal distance as an inter-vehicle distance between the first vehicle and the second vehicle in the vehicle platoon. In addition or in alternative to and in any combination with the optional features previously explained in this paragraph, the controller may be configured to update the SDM when the first vehicle travels in the vehicle platoon with the second vehicle, and to update the determination of the safe longitudinal distance between the first vehicle and the second vehicle using the updated SDM.

Vehicle Platooning Operation

Figure 3:
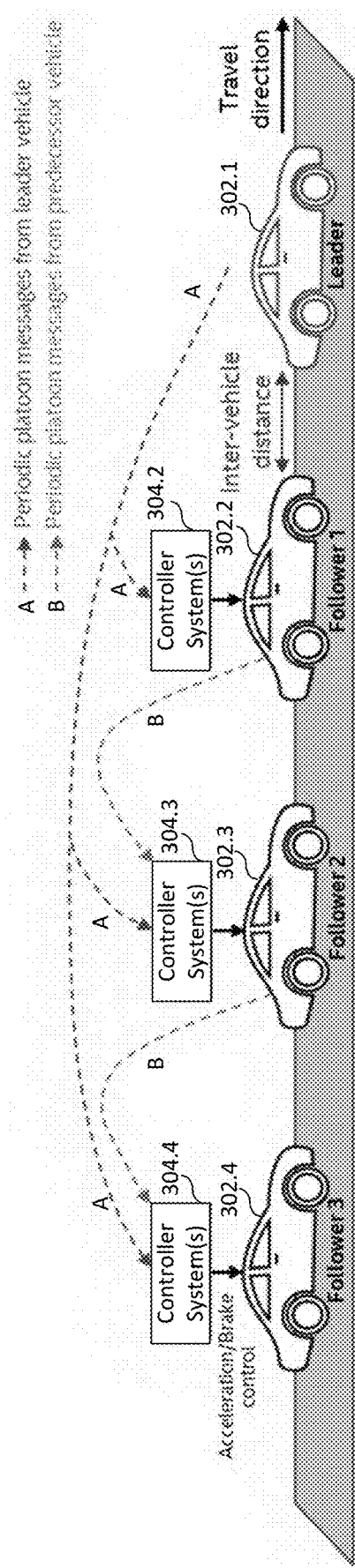
FIG. 3 illustrates a vehicle platoon, in accordance with the present disclosure.

FIG. 3 illustrates a vehicle platoon in accordance with the present disclosure. Again, vehicle platooning is a method by which a group of vehicles can travel closely and safely at high speeds. The advantages of platooning include greater fuel economy, improved highway efficiency, reduced congestion, etc. As shown in FIG. 3, a vehicle platoon 300 includes any suitable number of vehicles 302, with four being shown, although the vehicle platoon 300 may include any suitable number of vehicles. In the vehicle platoon 300, each vehicle 302.1-302.4 communicates with other vehicles through wireless communications. Although one-way communications are shown in FIG. 3 for ease of explanation, each of the vehicles 302.1-302.4 may transmit data to and/or receive data from any other of the vehicles 302 within the vehicle platoon 300, which may be implemented via one or more of the transceivers 208, 210, 212 identified with each vehicle 302, as discussed above with reference to FIG. 2 for instance.

When in a platooned arrangement as shown in FIG. 3, the vehicles 302.1-302.4 may periodically broadcast platoon messages to each following vehicle as shown in FIG. 3, with the leader vehicle 302.1. (i.e. the frontmost vehicle) transmitting platoon messages to each of the other vehicles 302.2-302.4, with the leader vehicle 302.1 also controlling the other following vehicles 302.2-302.4 in the vehicle platoon 300 using instructions that may be encoded in the platoon messages or via other suitable communications. Each vehicle 302.2-302.4 additionally transmits a platoon message to its respective following vehicle 302, i.e. the vehicle directly behind the vehicle transmitting the platoon message. Although FIG. 3 shows a vehicle travelling within single lane vehicle platoon, this is not a limitation and the disclosure includes implementations in accordance with vehicle platoons having any suitable type of arrangement or organization, such as multi-lane platoons for instance, which include several single-lane vehicle platoon as shown in FIG. 3. Thus, and as shown in FIG. 3, to facilitate vehicle control and as further discussed herein, each vehicle 302 in the vehicle platoon 300 uses one or more controllers or controller systems 304, which control different portions of the vehicle 302 such as longitudinal control, lateral control, etc. The controller system(s) 304 as shown in FIG. 3 may be implemented as the CACC controller and/or lateral controller as discussed herein with respect to FIG. 2.

Again, CACC is a control system that may be implemented to control the inter-vehicle or longitudinal distance between vehicles in a platoon, such as the vehicle platoon 300 as illustrated in FIG. 3 to regulate the inter-vehicle distance as shown. The disclosure as described herein implements a CACC controller which exploits the information received by the leader or frontmost vehicle 302.1 as well as each vehicle's immediate front (predecessor) vehicle 302 as illustrated in FIG. 3, which may be contained in the periodically-transmitted platoon messages. This control system utilizes each vehicle 302's on-board sensors (image acquisition devices 104, position sensors 106, speed sensors 108, radar sensors 110, LIDAR sensors 112, etc.), in addition to inter-vehicle communication to achieve constant spacing between the platoon vehicles while ensuring string stability. Through the use of the wireless communications, the platoon vehicles 302 can exploit information such as a desired acceleration (instead of measured acceleration) of other vehicles 302 in the vehicle platoon 300, which gives an advantage in terms of system reactivity. The control system implemented via the CACC controller of one or more of the vehicles 302 (or each vehicle 302) in the vehicle platoon 300 as shown in FIG. 3 may be realized as the mathematical expression of various parameters, which are represented in Equation 1 below as follows:

$$u_i = a_1 u_{i-1} + a_2 u_0 + a_3(\dot{x}_i - \dot{x}_{i-1}) + a_4(\dot{x}_i - \dot{x}_0) + a_5(x_i - x_{i-1} + l_{i-1} + d_d),$$ Eqn. 1:

where $x_i$, $\dot{x}_i$ represent the position and speed of an ith vehicle in the vehicle platoon 300, respectively;

$x_{i-1}$, $\dot{x}_{i-1}$ represent the position and speed of the vehicle in front of the ith vehicle in the vehicle platoon 300, respectively;

$u_i$ represents the desired acceleration of the ith vehicle in the vehicle platoon 300;

$l_{i-1}$ represents the length of the vehicle in front of the ith vehicle in the vehicle platoon 300; and $d_d$ represents the desired inter-vehicle spacing from the ith vehicle to the vehicle directly in front of the ith vehicle.

With reference to Eqn. 1 above, the index i=0 is used for the leader vehicle 302.1 and i>0 for the following vehicles 302.2-302.4. The quantities $a_1$, $a_2$ . . . , $a_5$ are known as system constants, and are used in accordance with conventional CACC controller systems. Therefore, additional detail regarding these system constants are not provided herein for purposes of brevity.

The CACC controller system represented by Equation 1 above, when used as part of a conventional constant intervehicle spacing policy, does not specify how to choose a safe value for the constant spacing between the vehicles. Moreover, such conventional CACC controller systems do not consider the periodicity of the platoon messages in the control dynamics. The periodicity of platoon messages has a direct impact on the vehicle control dynamics, and hence on the safety of platoon vehicles. In practical V2X communication systems, the periodicity of the broadcast messages is typically in the range of 100's of milliseconds (ms). The periodicity of broadcast messages in LTE C-V2X can be configured in multiples of 100 ms. As further discussed below, the disclosure as described herein provides an enhanced technique of performing CACC control for vehicle platoons using the SDM, which incorporates the periodicity of platoon messages into the control dynamics.

Simulated Vehicle Platoon

For clarity and ease of explanation, a simulation framework was used to demonstrate the impact of platoon message frequency on the safety of a vehicles travelling in a vehicle platoon. In particular, a V2X channel model and platoon control model were developed in Python and then integrated with a CARLA-based simulation framework. The simulation scenario under consideration is similar to the vehicle platoon 300 shown in FIG. 3, which consists of a platoon of four vehicles (one leader and three followers) on a highway road. In this scenario, the inter-vehicle distance parameter for the CACC controller system was set to a constant value of 5m. Then, during the simulation, the leader vehicle 302.1 maneuvers in a predetermined way, whereas the following vehicles 302.2-302.4 use their respective CACC controller systems to control their longitudinal movement (throttle/braking). The leader vehicle 302.1 starts from a speed of zero and steadily accelerates until reaching a speed of 100 kph. The leader vehicle 302.1 then abruptly applies maximum braking to assess the behavior of the following vehicles 302.2-302.4.

Figure 4A:
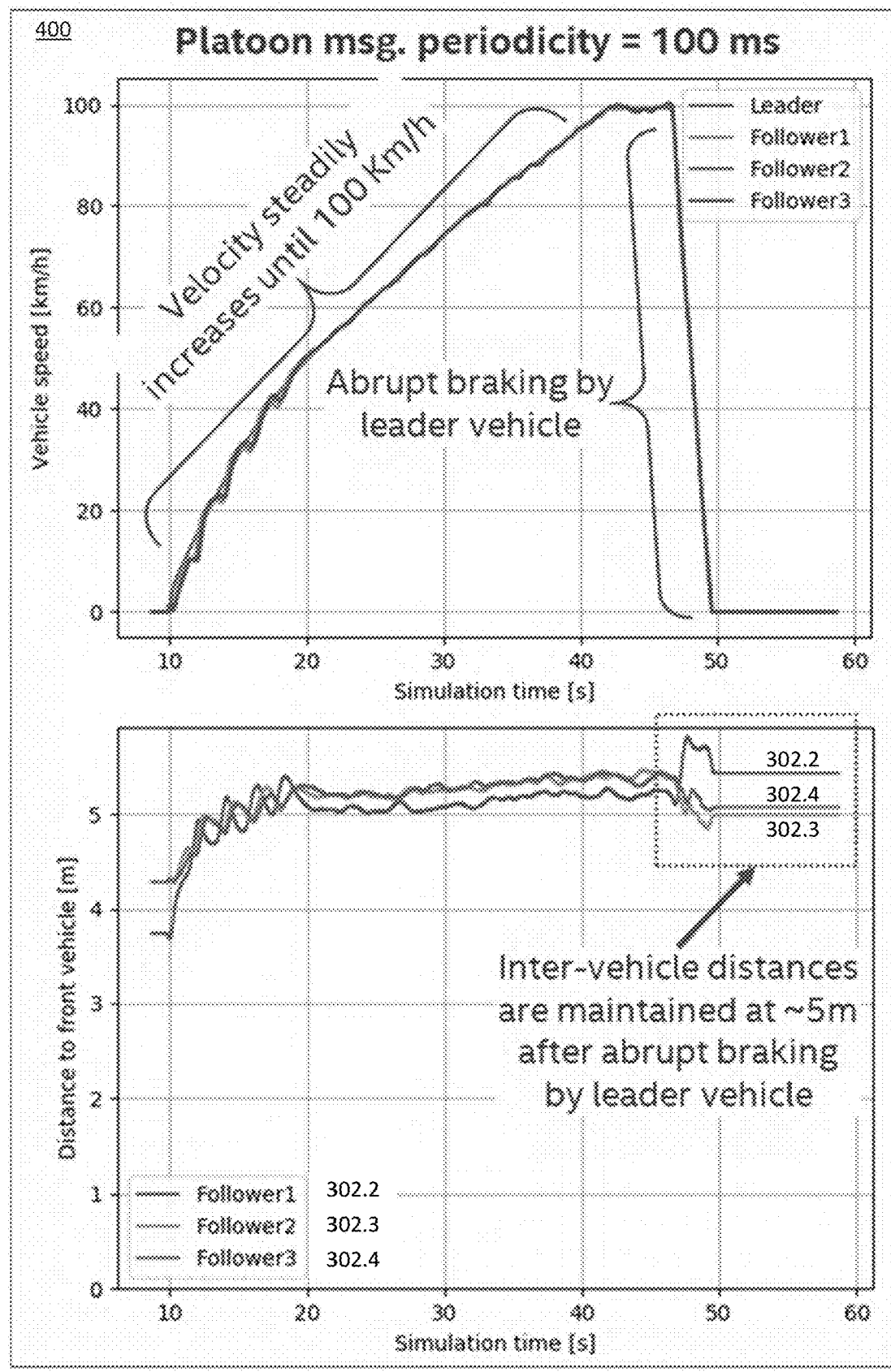
FIGS. 4A-4C illustrate graphs from simulations of a vehicle platoon that demonstrates the impact of platoon message periodicity on the performance of a vehicle CACC controller.
Figure 4B:
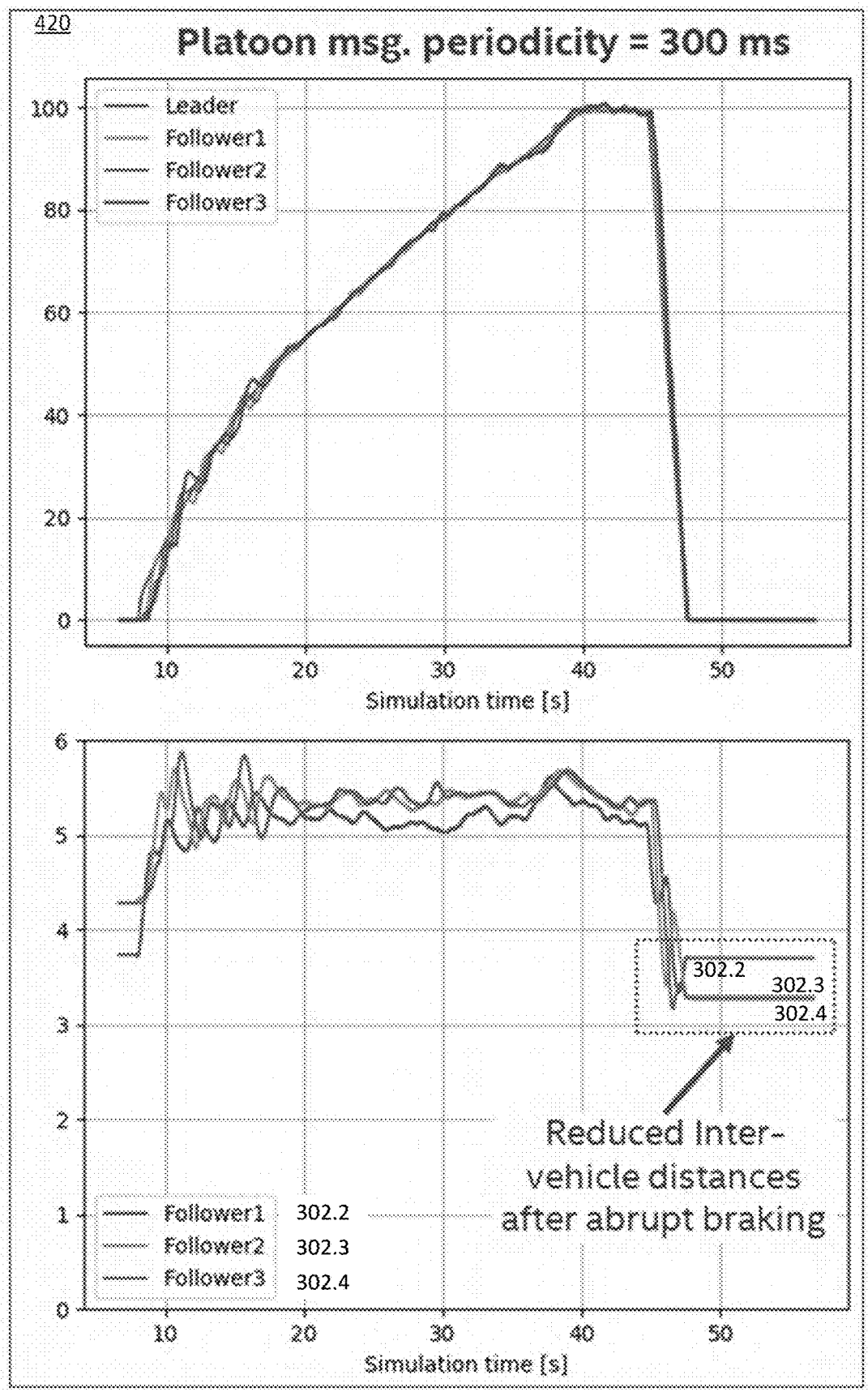
Figure 4C:
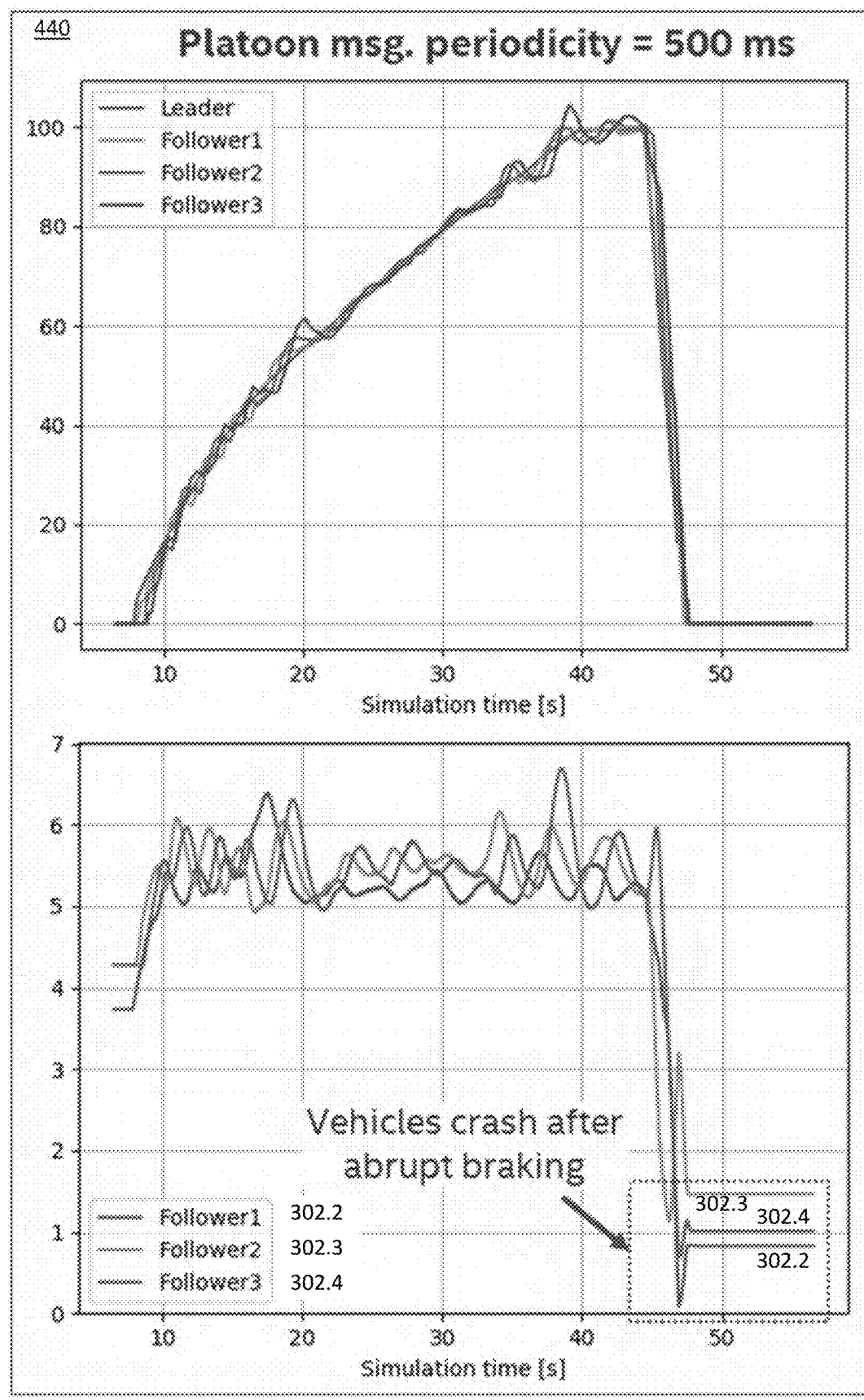

The results of this simulation run are shown in FIGS. 4A-4C, which demonstrates the impact of platoon message periodicity on the performance of the CACC controller system. The simulation results are shown with different periodicity of V2X platoon messages, with FIG. 4A representing the simulation results from a platoon message periodicity of 100 ms, FIG. 4B representing the simulation results from a platoon message periodicity of 300 ms, and FIG. 4C representing the simulation results from a platoon message periodicity of 500 ms. For each of the simulation results as shown in FIG. 4A-4C, the top portion of each graph illustrates a variation of velocities of the four vehicles over time for each different scenario, whereas the bottom portion of each graph illustrates the variation of inter-vehicle distances over time for the each different scenario. For the case of 100 ms platoon message periodicity as shown in FIG. 4A, it can be seen that when the leader vehicle 302.1 applies abrupt braking, the inter-vehicle distances are still closely maintained at 5m. However, for the case of 300 ms platoon message periodicity as shown in FIG. 4B, the inter-vehicle distances reduce to about 3.5m during the abrupt braking, which shows the limitation of CACC controller system. For the case of 500 ms platoon message periodicity as shown in FIG. 4C, the vehicles 302 crash into their respective front vehicles as the inter-vehicle distances approach 0m. The simulation results in FIGS. 4A-4C thus demonstrate the significant impact of platoon message periodicity on the safety of platoon vehicles, and also the limitation of CACC controllers which do not take into account the periodicity of platoon messages.

Utilizing Platoon Message Periodicity to Improve Vehicle Platoon Safety

The disclosure as described herein addresses such issues by introducing an SDM-based platooning technique in which the SDM is used to dynamically determine a safe inter-vehicle distance parameter by considering the periodicity of platoon messages and the current speed of the vehicle platoon. The CACC controller functionality as discussed herein may be implemented, for instance, via any suitable components of the one or more processors 102 as shown and discussed above with reference to FIG. 2, which may form the entirety of or any portion of the CACC controller used by one or more vehicles while travelling in, joining, and/or exiting a platoon (the vehicles 302.1-302.4). Moreover, the periodic platoon messages may be broadcasted by and/or received via one or more vehicles 302.1-302.4 via any suitable communication interface associated with a respective transceiver (the second links 222 and/or the links 204A and/or 204B) as discussed above with reference to FIG. 2.

Again, the SDM may be generated by the CACC controller and/or other suitable components of the vehicle in which the CACC controller is implemented (the one or more processors 102, which may include the execution of computer-readable instructions stored in the memory 202, for instance). The SDM includes one or more SDM parameters, and one or more of the vehicles 302 may generate the SDM (via its respective CACC controller) to perform various vehicle control functions using one or more of these SDM parameters. For instance, the SDM may include a defined safe longitudinal distance between a first vehicle (such as vehicle 302.2) and another vehicle within the vehicle platoon 300 (such as the vehicle 302.1). As discussed herein, one or more of the vehicles 302 travelling within the vehicle platoon 300 may use its respective SDM to calculate this safe longitudinal distance value, which may then be used as the desired inter-vehicle spacing $d_d$ for the CACC controller system in accordance with Equation 1 above to facilitate CACC control of that particular vehicle while travelling within the vehicle platoon 300.

To do so, the SDM defines various SDM parameters that include the safe longitudinal distance between two vehicles 302 travelling in the same direction (such as together within the vehicle platoon 300) in accordance with Equation 2 below as follows:

$$d_{min} = \left[ v_r \rho + \frac{1}{2} a_{max,accel} \rho^2 + \frac{(v_r + \rho a_{max,accel})^2}{2 a_{min,brake}} - \frac{v_f^2}{2 a_{max,brake}} \right], \quad \text{Eqn. 2}$$

where $v_f$, $v_r$ represent the longitudinal velocities of a leading vehicle (such as vehicle 302.1) and a following vehicle (such as vehicle 302.2), respectively;

$a_{max,accel}$, $a_{min,brake}$ represent the maximum acceleration and braking of the following vehicle (such as vehicle 302.2);

$a_{max,brake}$ represents the maximum braking of the leading vehicle (such as vehicle 302.1); and $\rho$ represents the response time of the following vehicle (such as vehicle 302.2).

In other words, Eqn. 2 represents a minimum safe longitudinal distance from the standpoint of a following vehicle (such as one of the vehicles 302.2-302.4) travelling within the vehicle platoon 300, which represent the distance from that vehicle to the vehicle directly in front of it. Thus, the response time parameter of a vehicle may represent the time period between a change in the nearby environment of a particular vehicle (such as a following vehicle 302.2, 302.3, 302.4) and the corresponding responsive actuation by that vehicle. In the case of two vehicles (such as leading vehicle 302.1 and following vehicle 302.2) traveling in same direction, the response time of the following vehicle 302.2 may represent a summation of a time period to detect a change in acceleration of the leading vehicle 302.1, a time for path planning and necessary actuation of controls by the vehicle 302.2, and a time for mechanical actuation of the vehicle 302.2.

In accordance with the SDM used by a vehicle 302 travelling in the vehicle platoon 300, and in particular the relationship defined above in accordance with Equation 2, the smaller the response time $\rho$ of a vehicle, the smaller the required longitudinal distance $d_{min}$. In case of typical autonomous driving, one or more of the sensors 104, 106, 108, 110, 112 (LIDAR, cameras, etc.), are used to detect the change in acceleration of the leading vehicle. However, the sensing and detection delays may contribute significantly to the overall response time. On the other hand, in the case of a vehicle platoon, a vehicle can use a communication channel (such as a V2X channel) to proactively inform any changes in its actuation to the other vehicles of the platoon. In this way, the response time of vehicle platoon 300 may be decreased by using a suitable communication channel for the transmission and reception of platoon messages, which in-turn decreases the required safe longitudinal distance.

Figure 5:
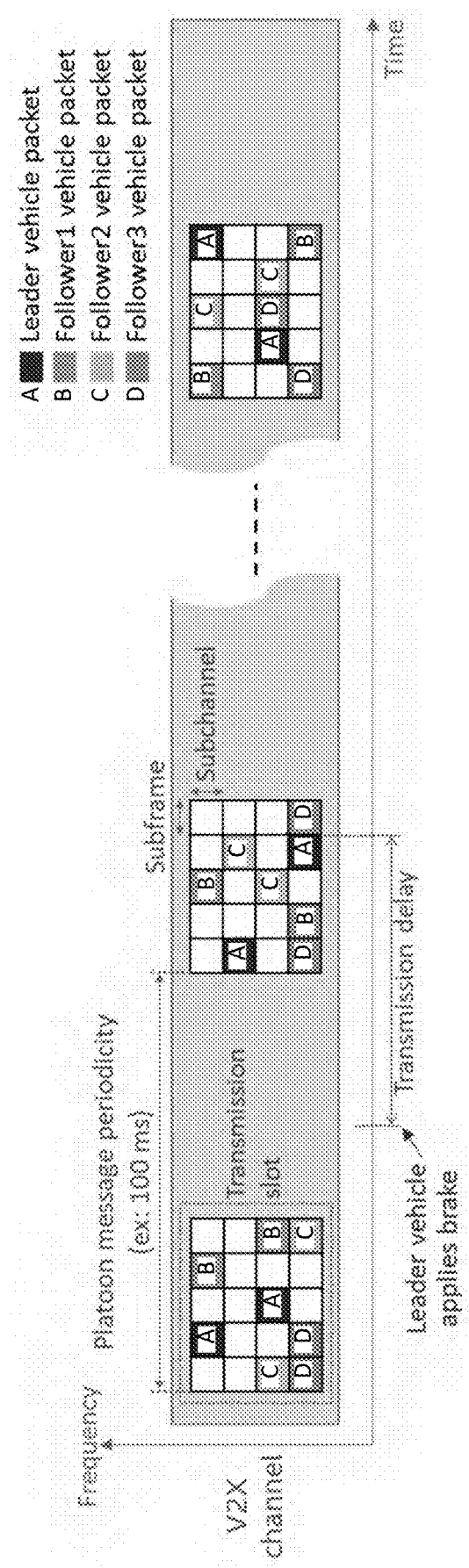
FIG. 5 illustrates a protocol format for periodic transmission of platoon messages by platoon vehicles, in accordance with the present disclosure.

FIG. 5 illustrates a protocol format for periodic transmission of platoon messages by platoon vehicles, in accordance with the present disclosure. Again, and with reference to FIG. 3, such platoon messages may be transmitted and received by the vehicles 302 while travelling within the vehicle platoon 300, and such communications may occur in accordance with any suitable type of communication protocols. A V2X channel is illustrated in further detail, although this is a non-limiting instance. It is noted that the platoon messages may alternatively be referred to herein simply as messages. Moreover, the protocol format shown in FIG. 5 may also be used to communicate other types of messages in addition to the platoon messages, such as control messages, environmental information, etc. to the other vehicle platoon members.

As shown in FIG. 5, an orthogonal frequency division multiplexing (OFDM) based V2X channel is implemented for the transmission of the platoon messages, in which the resource set is formed by a grid of subchannels in the frequency domain (the y-axis) and the subframes in time domain (the x-axis). This resource set is available periodically (every 100 ms, every 200 ms, etc.) for transmission by each of the vehicles 302.1-302.4 travelling in the vehicle platoon 300, as shown in FIG. 3. Thus, each vehicle 302.1-302.4 may select any suitable number of resource units in a random manner (or through a more sophisticated scheduling technique, including known techniques), which may be dependent upon the particular communication protocol, the size of the platoon messages, etc. As shown in FIG. 5, each vehicle 302.1-302.4 randomly selects two resource units, one for an original platoon message transmission, and another repeated platoon message to provide message redundancy. The redundant platoon message avoids the half-duplex issue of the transceiver and improves the transmission reliability.

The platoon message periodicity may be any suitable time period and is a function of the particular communication protocol that is implemented. A typical platoon message periodicity may be in the range of 100's of ms and, for LTE C-V2X, the periodicity is a multiple of 100 ms. When there is a change in the vehicle actuation (a leader vehicle applies the brake), this information is transmitted during the next transmission slot, which gives rise to the transmission delay as illustrated in FIG. 5. Thus, the maximum transmission delay cannot exceed the platoon message periodicity. As a result, the response time of a platoon vehicle may be calculated by considering the maximum transmission delay represented in Equation 3 as follows:

$$\rho = \text{platoon\_message\_periodicity} + \text{planning\_delay} + \text{actuation\_delay} \quad \text{Eqn. 3:}$$

In other words, the response time includes a summation of communication delays of the platoon messages periodically received from a leading vehicle, planning delays for calculating path planning for the following vehicle, and actuation delays for controlling the following vehicle. The planning delays and actuation delays may be derived, for instance, from trial runs, calibrated test data, simulated test data, a history of previous delays for that particular vehicle, etc.

The response time expressed in Equation 3 is calculated using these known terms, with the platoon message periodicity being known as part of the data transmitted with the platoon messages or otherwise known by the following vehicle as part of the established communication protocol parameters. The calculated response time above is then substituted into Equation 2 to calculate the minimum safe longitudinal distance as part of the SDM parameters that constitute the SDM, which is in turn substituted into Equation 1 as $d_d$ to provide the desired inter-vehicle spacing for the CACC control system used by the following vehicle. In this way, a following vehicle 302 in the vehicle platoon 300 may utilize the platoon message periodicity to calculate the safe longitudinal distance as an inter-vehicle distance between itself (such as vehicle 302.2) and the leader vehicle that it is following (such as vehicle 302.1) while travelling together in the vehicle platoon 300.

Each vehicle 302 travelling within the vehicle platoon 300 may update its own SDM based upon received platoon message content and/or the periodicity of the platoon messages. For instance, if the platoon message periodicity increases from 100 ms to 200 ms, then a following vehicle may calculate an increased response time as a result of the increased transmission delay/latency, and increase the safe longitudinal distance used as the inter-vehicle distance as a result. Thus, each vehicle 302 within the vehicle platoon 300 may dynamically and/or continuously update its own SDM and accompanying SDM parameters based upon changes to the environment, which may include the periodicity of the received platoon messages as well as other variables as further discussed herein. A platoon vehicle 302.2 may utilize its CACC controller to update its SDM while travelling within the vehicle platoon 300, and update the calculation of the safe longitudinal distance between itself and the leader vehicle (such as vehicle 302.1) using the updated SDM (such as the updated SDM parameters).

Simulation Results

Figure 6A:
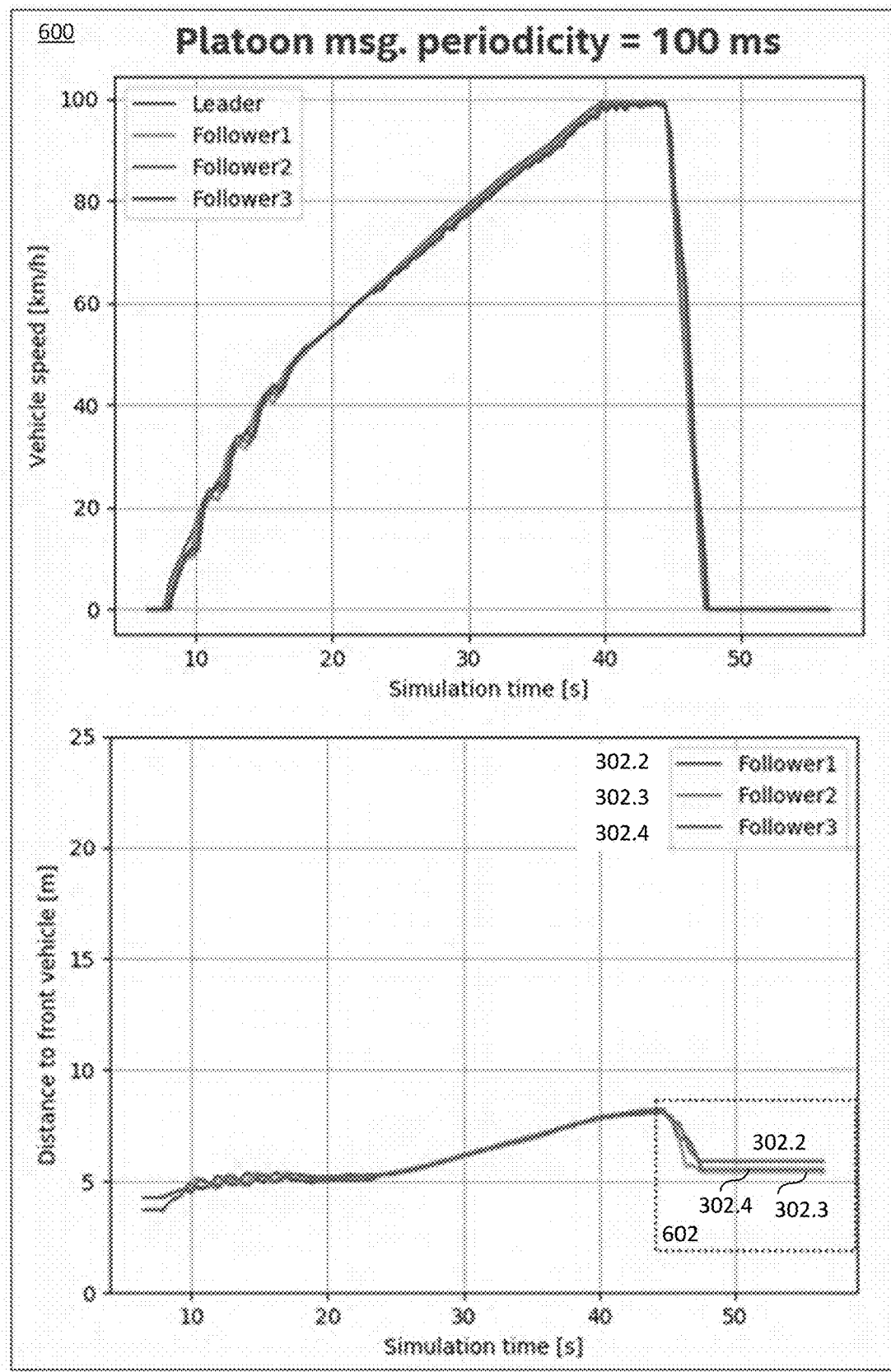
FIGS. 6A-6C illustrate graphs from simulations of a vehicle platoon that demonstrates the impact of platoon message periodicity on the performance of a vehicle CACC controller using an SDM-based CACC control system, in accordance with the present disclosure.
Figure 6B:
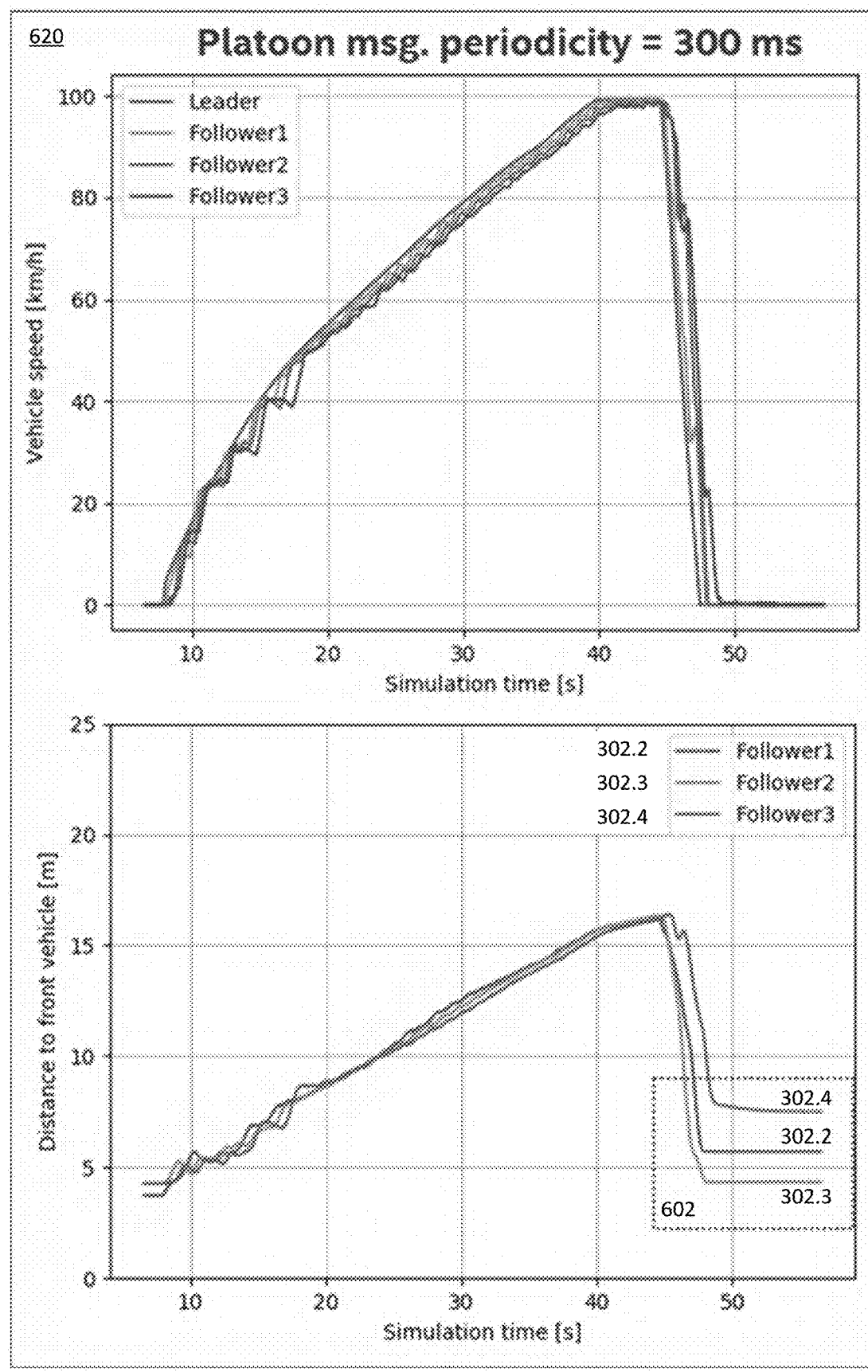
Figure 6C:
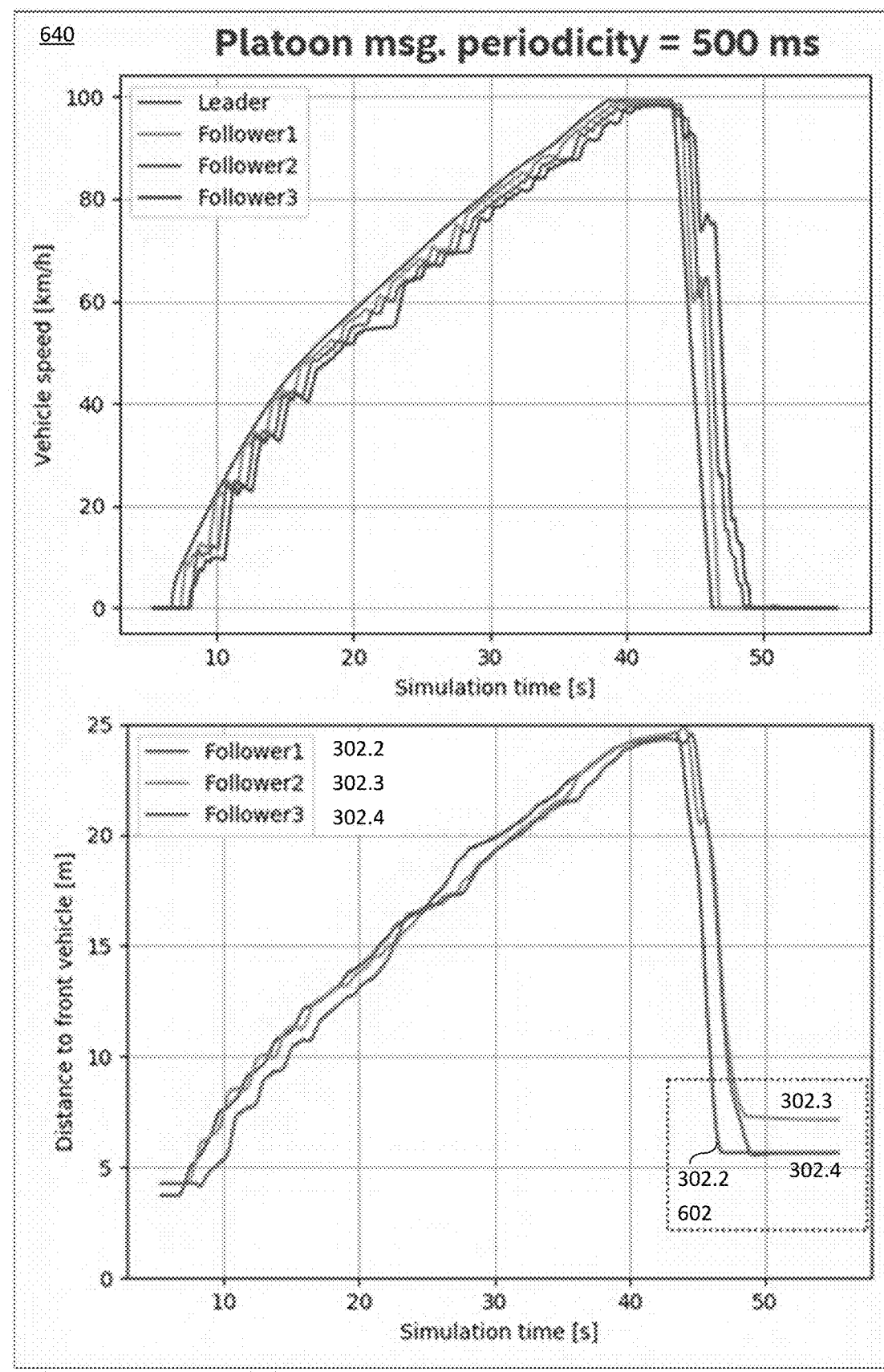

FIGS. 6A-6C illustrate graphs from simulations of a vehicle platoon that demonstrate the impact of platoon message periodicity on the performance of a vehicle CACC controller using an SDM-based CACC control system, in accordance with the present disclosure. Similar to the simulation results as shown in FIGS. 4A-4C, the simulation results are shown in FIG. 6A-6C with different periodicity of V2X platoon messages, with FIG. 6A representing the simulation results from a platoon message periodicity of 100 ms, FIG. 6B representing the simulation results from a platoon message periodicity of 300 ms, and FIG. 6C representing the simulation results from a platoon message periodicity of 500 ms. However, in contrast to the simulation graphs as shown in FIGS. 4A-4C, the simulation graphs shown in FIGS. 6A-6C are the result of a simulation that implements the dynamic SDM parameter updates with consideration of the periodicity of the platoon messages with respect to the response time as described above.

The simulation results as shown in FIGS. 6A-6C were produced using a CARLA based simulation framework as described above with respect to the simulation results as shown in FIGS. 4A-4C. In the simulation scenarios as shown in FIGS. 6A-6C the leader vehicle 302.1 starts from a speed of 0 kph and then steadily accelerates until the vehicle 302.1 reaches 100 kph. Then, the leader vehicle 302.1 abruptly applies maximum braking. This abrupt braking maneuver by the leader vehicle 302.1 allows for the assessment of the behavior of following vehicles 302.2-302.4. The top portion of each of the graphs illustrated in FIGS. 6A-6C show the variation of velocities of the four vehicles 302.1-302.4 over time for the different scenarios of different platoon message periodicity. The bottom portion of each graph shows the variation of inter-vehicle distances over time for the different scenarios. Unlike the conventional CACC control approach illustrated in the simulation results shown in FIGS. 4A-4C, the proposed SDM-based CACC system in accordance with the disclosure as described herein adjusts the inter-vehicle distances to safe values depending on the vehicle speed and the periodicity of platoon messages. As can also be observed in the inset 602 in each of the FIGS. 6A-6C, when the leader vehicle 302.1 brakes abruptly, the inter-vehicle distances are maintained within safe range in all three cases of platoon message periodicities, even for the longest periodicity of 500 ms as shown in FIG. 6C, unlike the analogous scenario shown in FIG. 4C.

Utilizing Vehicle Kinematics to Improve Vehicle Platoon Safety

As discussed above, the disclosure as described herein may consider the periodicity of the platoon messages transmitted by other vehicles (such as each respective platoon vehicle's lead vehicle that it is directly following) to update that vehicle's SDM. This may include, for instance, redefining or updating the SDM parameters such as the response time and safe longitudinal distance and, in turn, the inter-vehicle spacing used for the CACC controller system based upon the platoon message periodicity. Additionally or alternatively, and as discussed in further detail in this Section, one or more of the vehicles 302 in the vehicle platoon 300 may update its respective SDM parameters based upon vehicle kinematics modeling.

For instance, conventionally the maximum acceleration of a particular vehicle may be calculated for use as part of its SDM model (see Equation 2) by determining the vehicle's maximum acceleration as a static value. This static value represents a vehicle's capability of maximum acceleration under ideal conditions or otherwise without consideration to other dynamic factors such as the vehicle's current speed and/or drive gear, both of which may influence the vehicle's actual maximum acceleration at a particular time.

The calculation of a dynamic and more accurate maximum acceleration value may be particularly advantageous for vehicles travelling within a vehicle platoon. Thus, each vehicle within a vehicle platoon may utilize a kinematics model to more accurately represent a respective vehicle's maximum acceleration as a dynamic value that changes in response to various driving conditions. For instance, in Equation 2 described above, the maximum acceleration $a_{max,accel}$ of a following vehicle (such as one of the following vehicles 302.2-302.4) represents the maximum acceleration as a variable quantity, which depends on the characteristics of the vehicle subsystems such as engine power, torque, gear ratio, mass, etc., and also on environmental characteristics such as air resistance, gravitational force, and other frictional forces. The disclosure as described herein implements a realistic modeling of the vehicle kinematics to determine the safe longitudinal distance between the platoon vehicles by calculating the maximum acceleration in Equation 2 above to determine the safe longitudinal distance between two vehicles travelling in the same direction, and then utilizing this value as the desired inter-vehicle spacing by the CACC controller system as represented in Equation 1 above.

To do so, one or more (or all) of the vehicles 302.1-302.4 in the vehicle platoon 300 may implement any suitable combination of hardware and software components to generate and/or calculate the kinematics model based upon various parameters, as discussed in further detail herein. For instance, the CACC controller associated with each vehicle 302 in the vehicle platoon 300, as discussed herein with reference to FIG. 2, may perform these operations to generate or otherwise calculate the kinematics model. The CACC controller and/or the one or more processors 102 associated with each vehicle 302 in the vehicle platoon 300 may calculate the vehicle kinematics model using dedicated hardware circuitry and/or the execution of computer-readable instructions stored in an accessible memory (such as the one or more memories 202) by the one or more processors 102.

In any event, one or more of the vehicles 302 (or all vehicles 302) in the vehicle platoon 300 may calculate a dynamic kinematics model associated with movement of the vehicle using any suitable number and type of parameters that may influence the maximum acceleration of the vehicle 302. The dynamic kinematics model may include various kinematics parameters that differ based on the vehicle type, such as whether the vehicle is a conventional vehicle or an electric vehicle. A maximum acceleration $a_{max,accel}^{conv\_veh}$ of a conventional vehicle with a combustion engine, a differential, and a gearbox can be accurately modelled as a function of vehicle speed $\dot{x}$ and the currently engaged drive gear $i_g$. Such a dynamic kinematics model is expressed below as Equation 4:

$$a_{max,accel}^{conv\_veh}(\dot{x}, i_g) = \frac{\eta P_{eng}(N_{eng})K}{\dot{x}\lambda m}, \quad \text{Eqn. 4}$$

with the engine speed $N_{eng}$ being further represented in Equation 5 below as follows:

$$N_{eng} = \frac{60 i_d i_g}{d_{wheel} \pi} \dot{x} \quad \text{Eqn. 5}$$

With reference to Equations 4 and 5 above, $P_{eng}$ represents a vehicle's engine power corresponding to its current speed $N_{eng}$. The parameter $\eta$ represents the engine efficiency, $i_d$ represents the differential gear ratio, $d_{wheel}$ represents the diameter of the tractive wheels, $\lambda$ represents a factor that accounts for the inertia of rotating mechanical components in driveline, K represents the braking horsepower (BHP) to Watt conversion factor (745.699872), and m represents the mass of the vehicle.

Figure 7:
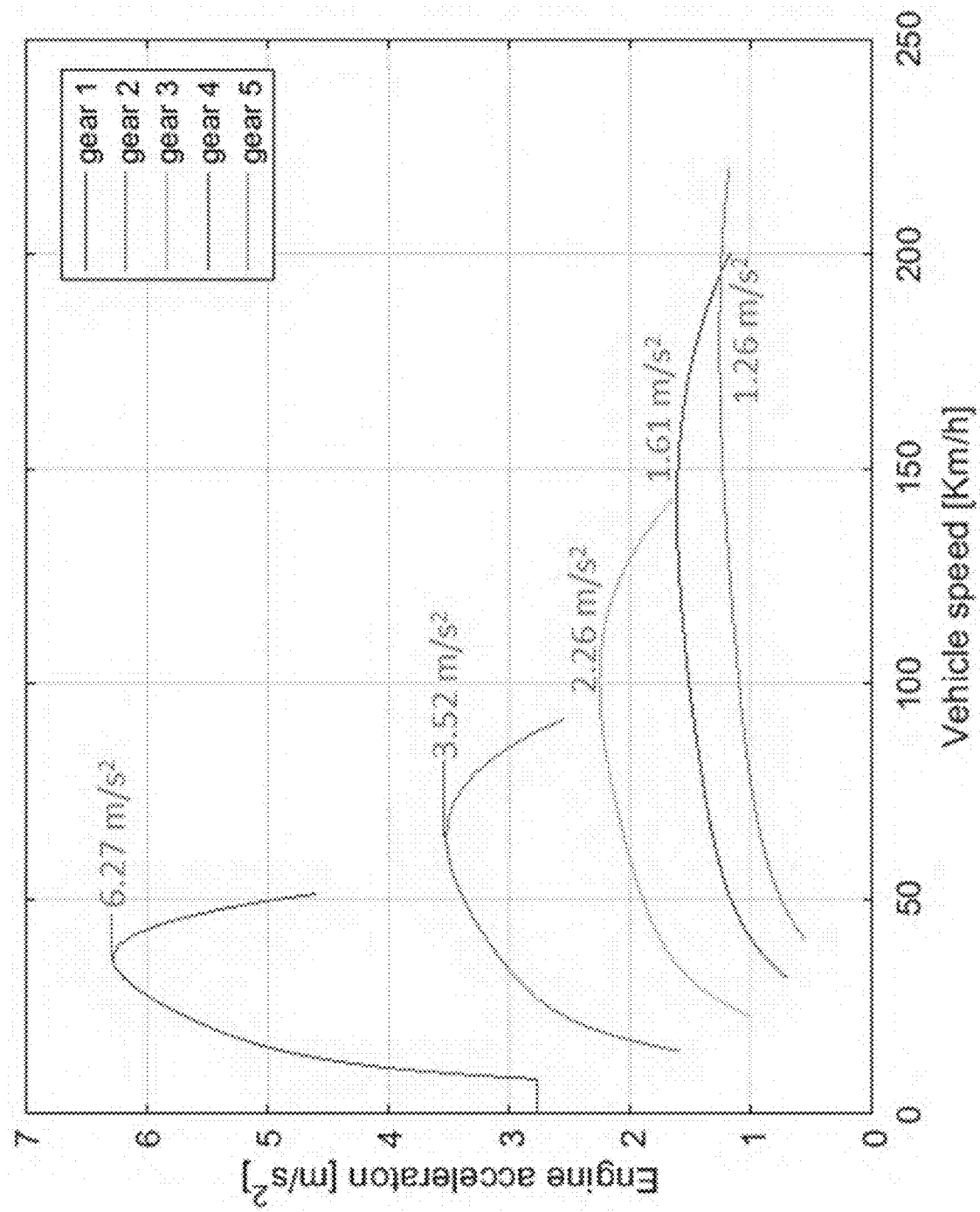
FIG. 7 illustrates acceleration curves calculated using a kinematics model, in accordance with the present disclosure.

Reference is now made to FIG. 7, which shows the maximum acceleration of a vehicle as a function of vehicle speed and the current drive gear. The maximum acceleration curves as shown in FIG. 7 are calculations performed using parameters associated with a kinematics model in accordance with Equation 4 as described above. The kinematic parameters used to calculate the acceleration curves shown in FIG. 7 in this manner are shown below in Table 1.

TABLE 1

| Parameter | Value |
|---|---|
| Vehicle mass (m) | 1000 Kg |
| Engine differential (final) ratio ($i_d$) | 4.0 |
| Engine efficiency ($\eta$) | 0.9 |
| Minimum engine speed | 1000 rpm |
| Maximum engine speed | 6300 rpm |
| Gear ratios ($i_g$) | {3.78, 2.12, 1.36, 0.97, 0.76} |
| Wheel diameter ($d_{wheel}$) | 0.656 m |

In other words, a vehicle 302 (a following vehicle such as vehicle 302.2) may determine its own maximum acceleration value by correlating its current speed and drive gear to an acceleration value matching the appropriate acceleration curve in FIG. 7. In this way, the parameters shown Table 1 above may be used to calculate the maximum acceleration value once the speed and drive gear are known, with the other parameters being predetermined on a vehicle-to-vehicle basis and thus known a priori, as these values typically do not change in a dynamic manner (vehicle mass, differential ratio, wheel diameter, engine efficiency, minimum and maximum engine speed, etc.).

In other words, a vehicle 302 (via its CACC controller or other suitable processing circuitry) may calculate its maximum acceleration value using the constructed dynamic kinematics model. Once this maximum acceleration value is determined in this way, the vehicle utilizes (via its CACC controller) this value as an SDM parameter in accordance with Equation 2 as noted above as $a_{max,accel}$ to determine the safe longitudinal distance between two vehicles travelling in the same direction, and then further utilizing this value as the desired inter-vehicle spacing of the CACC control system represented in Equation 1. That is, once the vehicle 302 calculates the inter-vehicle distance, the CACC controller or other suitable component of the vehicle 302 may use this value in accordance with the CACC control system. In this way, the kinematics model may be implemented to accurately and dynamically determine an SDM-based safe longitudinal distance between the platoon vehicles.

Alternatively, the vehicle 302 determines a maximum acceleration value am $a_{max,accel}$ using only the vehicle's current drive gear and without considering the vehicle's current speed. A vehicle 302 may consider different maximum acceleration values depending on the currently-engaged drive gear of the vehicle. As shown in FIG. 7, there are 5 drive gears and the corresponding maximum acceleration values are {6.27, 3.52, 2.26, 1.61, 1.26} m/s². Thus, a vehicle may ignore its current speed parameter and only consider the current drive gear to determine the maximum acceleration value by correlating the current drive gear to the respective maximum acceleration value derived from each of the acceleration curves as shown in FIG. 7 (i.e. {6.27, 3.52, 2.26, 1.61, 1.26} m/s²). This may be particularly advantageous as it provides a simpler (and thus faster) technique by which to obtain the maximum acceleration value, since the vehicle speed is not required to determine the maximum acceleration.

Regardless of how the maximum acceleration value is calculated in accordance with the kinematics model, each vehicle 302 travelling within the vehicle platoon may update its own SDM based changes to the maximum acceleration value over time. For instance, if the vehicle 302.2 changes speed and/or the currently engaged drive gear, then the vehicle 302.2 may adjust the maximum acceleration value, and in turn also adjust the safe longitudinal distance used as the inter-vehicle distance as a result. Thus, each vehicle 302 within the vehicle platoon 300 may dynamically and/or continuously update its own SDM and accompanying SDM parameters based upon changes to the environment, which includes changes to the vehicle's speed and/or drive gear. These updates may be performed in conjunction with or independently from the other SDM parameter updates, such as those discussed above with respect to the periodicity of the received platoon messages, as well as other variables as further discussed herein. A platoon vehicle 302.2 may utilize its CACC controller to calculate changes to its maximum acceleration value, update its SDM while travelling within the vehicle platoon 300, and update the calculation of the safe longitudinal distance between itself and the leader vehicle (such as vehicle 302.1) using the updated SDM (such as the updated SDM parameters).

Additional Enhancements to Improve Vehicle Platoon Safety

The previous Sections focused on the use of an SDM-based CACC controller system to improve upon the safety of platooned vehicles. This includes the use of platoon message periodicity and the dynamic calculation of a platoon vehicle's maximum acceleration value to calculate and dynamically update the SDM to calculate the minimum safe longitudinal distance as part of the SDM parameters, which is in turn used as the desired inter-vehicle spacing for the CACC controller system used by the platoon vehicle. Again, these techniques may be combined with one another or implemented independently. In addition to these techniques or as an alternative, the following Sections propose additional enhancements to the SDM-based CACC control systems to further improve the safety of platoon vehicles. Each of these techniques may be implemented individually, in combination with one another, or in combination with any of the other techniques described herein.

SDM-Based Platoon Formation, Dissolution, and Organization of CAVs

As noted above, the vehicles 302 may communicate with one another and/or other vehicles within a particular environment, such as while driving on a road for instance. These communications may be implemented via one or more of the transceivers 208, 210, 212 as discussed above with respect to FIG. 2, and may facilitate the exchange of data between the vehicles 302 in accordance with any suitable number and/or type of communication protocols. Regardless of the particular communication protocol that is implemented, the vehicles 302 may exchange control messages, which may be the aforementioned platoon messages or separate, additional messages, during platoon formation and dissolution. Platoon control messages may be exchanged between a platoon leader (such as vehicle 302.1) and follower CAVs (such as vehicles 302.2-302.4) to facilitate CAVs joining and leaving the vehicle platoon.

SDM status data may be encoded in these control messages (such as via a vehicle 302's one or more of the transceivers 208, 210, 212). The SDM status data may then be received and decoded by one or more recipient vehicles 302 (such as via a recipient vehicle 302's one or more of the transceivers 208, 210, 212). In accordance with the present disclosure, one or more follower vehicles (such as the vehicles 302.2-302.4) may also transmit their SDM status data to the leader vehicle (such as the vehicle 302.4) in the vehicle platoon using such control messages.

The SDM status data may include status information (such as whether the SDM system is currently enabled or disabled by the transmitting vehicle), a current SDM configuration, which may include the various SDM parameters as discussed herein that are used in accordance with a current SDM model, etc. The platoon leader may then utilize this information to instruct the follower CAVs to make suitable changes to their SDM configurations for compatibility with the vehicle platoon. This may include, for instance, instructions to modify a vehicle's SDM configuration to include additional or alternate factors, which may be represented as additional or alternate SDM parameters that are currently being considered by the other vehicle platoon members' SDM model configuration such as the characteristics of the participating CAVs, environment and weather conditions, etc.

A platoon leader vehicle may perform SDM-aware organization of the follower CAVs by using their shared SDM parameters. Thus, when an external CAV (i.e. a vehicle not currently part of the vehicle platoon) transmits a platoon join request message to the platoon leader by including its SDM status data, the platoon leader may execute (via the one or more processors 102 executing computer-readable instructions stored in the memory 202) an optimization algorithm by considering the SDM parameters of all current platoon CAVs as well as the SDM parameters of one or more new vehicles requesting to join the platoon. This optimization algorithm may be executed to identify one or more optimization goals or parameters. For instance, one optimization goal may include the determination of the best position for the requesting CAV that minimizes overall inter-vehicle distances while satisfying the safety conditions defined by the current SDM (the SDM to be used by each member of the vehicle platoon once joined). The optimization algorithm may be executed to determine any suitable number and/or type of optimization goal based upon the SDM parameters of all current platoon CAVs as well as the SDM parameters of one or more new vehicles requesting to join the platoon. Additional optimization goals may include a maximization of overall platoon efficiency with respect to various parameters (such as fuel efficiency), a minimization of other parameters such as wind resistance, etc.

With respect to the optimization of the position of a vehicle requesting to join a vehicle platoon, the platoon leader may instruct the requesting CAV to join the platoon at the optimized position, and instructing the other CAVs to make the necessary gap so that the requesting CAV can join the platoon at the optimized position. Furthermore, based on the periodic SDM status information broadcasted by the other platoon CAVs, the platoon leader may perform re-organization of the vehicle positions to ensure safety. The platoon leader (such as vehicle 302.1) may also instruct one or more of the CAVs in the vehicle platoon (which are affected by the addition of the new requesting vehicle) to reconfigure their SDM parameters as a result.

The vehicle 302.2 may transmit one or more platoon messages (which may be control messages) containing at least a portion of the set of SDM parameters used by the vehicle 302.2 for its SDM configuration to the leader vehicle 302.1. This may occur when the vehicle 302.2 is requesting to join the vehicle platoon and/or while the vehicle 302.2 is already part of the vehicle platoon 300. In any event, the leader vehicle 302.1 may receive the message and decode its contents, which may cause the vehicle 302.1 to transmit, to the vehicle 302.2 and/or any other vehicles 302 in the vehicle platoon, a platoon message (which may be part of the periodically transmitted platoon messages or a separate message) that contains instructions regarding an organizational change to the vehicle platoon 300. This organizational change may instruct one or more vehicles 302 of the vehicle platoon 300 to change positions, lanes, a platoon arrangement (such as to occupy an additional lane), etc. Additionally, when the organizational change is the result of a newly added vehicle to the vehicle platoon, the instructions may further instruct one or more of the vehicles 302.2-302.4 in the vehicle platoon which are affected by the addition of the new requesting vehicle to reconfigure their SDM parameters.

Collaborative SDM in CAV Platoons

The SDM parameters as discussed herein may be grouped into two categories: ego vehicle parameters and neighboring vehicle parameters. In the absence of vehicle communications (such as V2X communications), a CAV platoon member (such as one of the vehicles 302) sets the neighboring vehicle related SDM parameters to predetermined constant values by considering a worst case scenario. On the other hand, in the collaborative SDM framework the CAV platoon members (such as the vehicles 302) may share their ego SDM parameters with the nearby CAVs via V2X communications (e.g. as platoon messages or separate types of messages), which may include a vehicle 302 that is directly behind or in front of the transmitting vehicle, for instance. Then, the recipient CAVs may set the neighboring vehicle related SDM parameters to more accurate values by using the shared information received via the transmitted communications.

A collaborative SDM mechanism is implemented for the platoon control system, which will improve the safety and road usage efficiency of the platoon CAVs. To do so, the platoon CAVs may periodically broadcast their ego SDM parameters via the platoon control messages, as noted above and as shown in FIG. 3. The periodic broadcasting is useful as the SDM parameters may change over time depending on the environment and road conditions. Thus, each time a platoon CAV receives a platoon message with SDM parameters, the CAV may process the SDM parameters accordingly and update its SDM model if necessary.

A platoon message transmitted by the vehicle 302.1 may include at least a portion of a set of SDM parameters generated by the vehicle 302.1 (the ego SDM parameters associated with the vehicle 302.1 such as a current speed, direction, etc.). These SDM parameters are thus associated with the SDM used by the vehicle 302.1 to perform various control functions as discussed herein. The platoon message may then be received by the following vehicle 302.2, which may update (such as via its CACC controller) its own SDM using the portion of the set of SDM parameters received from the vehicle 302.1, which are considered neighbor SDM parameters from the perspective of the vehicle 302.2. Each vehicle 302 in the vehicle platoon 300 may be configured to transmit is own ego SDM parameters, or a portion thereof, as part of a platoon message or other suitable message that is received by a following vehicle 302, and in turn used by the following vehicle 302 to update its own SDM parameters accordingly. Thus, this enables a collaboration and sharing of the SDM parameters among each of the vehicles 302 in the vehicle platoon 300, allowing the vehicles 302 to update their individual SDMs based upon SDM parameters received from other platoon members.

Multicasting of Relevant Information within a Vehicle Platoon

Because the CAVs in a platoon follow their respective front vehicles closely, the CAVs may sustain major occlusions either in the front or in the back, or in both directions for a prolonged duration. To avoid any adverse effects of such major occlusions on the SDM model or the automated driving systems (ADS) of platoon CAVs, the platoon leader (such as vehicle 302.1) and the last follower CAV (such as vehicle 302.4) may multicast relevant information about the surrounding environment in both the forward (i.e. towards the front of the vehicle platoon 300 or towards vehicle 302.1) and rear directions (i.e. towards the rear of the vehicle platoon 300 or towards the vehicle 302.4). These communications may again be performed using any suitable type of communication protocol (such as a vehicle 302's one or more of the transceivers 208, 210, 212), which may include the use of V2X communications for instance. This information may also be helpful in certain emergency scenarios due to some emergency when a vehicle must leave the platoon abruptly, as sharing of information can help the onboard ADS and SDM model of a platoon vehicle 302 to make safe decisions for the time immediately after leaving the platoon.

Both the leader vehicle 302.1 and the rear-most following vehicle 302.4 may each respectively transmit platoon messages that may include any suitable type of information regarding the environment of the vehicle platoon 300. This may include one or more SDM parameters for each vehicle 302.1, 302.4 (ego SDM parameters) or other SDM parameters associated with other vehicles 302 in the vehicle platoon 300 (neighboring SDM parameters), as well as any other suitable type of data with respect to the environment in which the vehicle platoon is traveling. Parameters of the environment that may be detected in this context include perception information such as bounding boxes of nearby objects, video stream from a camera, etc. The platoon message transmitted by the vehicle 302.4 may then be received by the leader vehicle 302.1 (and optionally any other vehicles 302 within the vehicle platoon 300), and vice-versa.

Improved Platoon Response to Abrupt Braking

CAV platoons may avoid the risk of rear-end collisions in the event of emergency braking. To do so, certain follower vehicles 302 in the vehicle platoon 300 may utilize predetermined emergency maneuvering. Under this scheme, the platoon leader vehicle (vehicle 302.1) provides specific maneuvering instructions to each follower vehicle 302.2-302.4, which should be followed by each follower vehicle 302.2-302.4 in the event that an emergency braking procedure is required. The platoon leader vehicle may identify such emergency maneuvering instructions during the platoon setup, which may be performed in accordance with any suitable techniques, including known techniques, to do so. Additionally, the leader platoon vehicle may determine such predetermined emergency maneuvering instructions whenever a vehicle joins or leaves the platoon. In any event, the emergency braking maneuvering instructions may be calculated by the CACC controller and/or via the one or more processors 102 of a leader vehicle (such as vehicle 302.1) by executing computer-readable instructions stored in the memory 202 of the leader vehicle. The emergency maneuvering instructions may be calculated in a manner that reduces the overall risk of collisions of each of the vehicles 302 in the vehicle platoon 300. For any scenario, in the event of emergency braking, the follower CAVs (such as the vehicles 302.2-302.4) should execute the provided instructions for braking only if it is safe to do so (e.g. only if doing so does not violate their own SDM configurations).

Figure 8A:
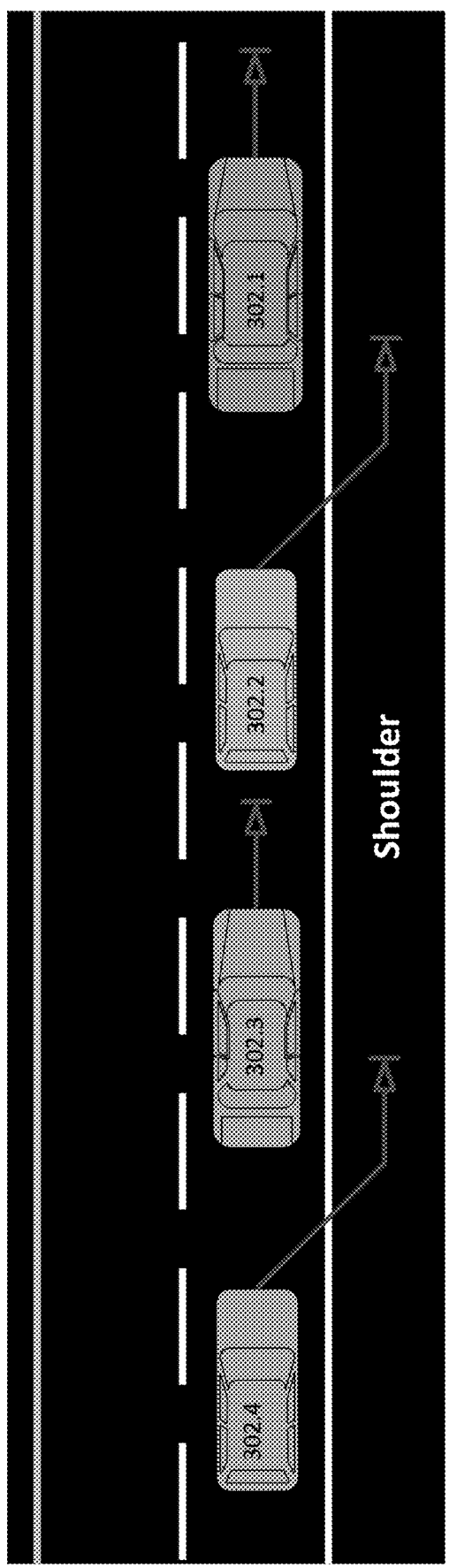
FIG. 8A illustrates an emergency maneuver for a vehicle platoon, in accordance with the present disclosure.
Figure 8B:
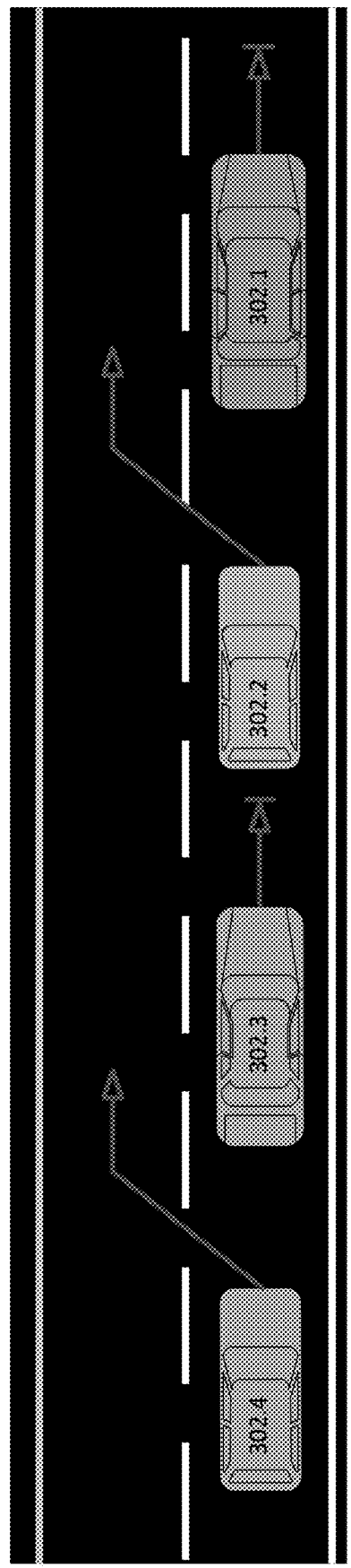
FIG. 8B illustrates another emergency maneuver for a vehicle platoon, in accordance with the present disclosure.

The emergency maneuvering instructions may be transmitted as part of the platoon messages to each of the vehicles 302 in the vehicle platoon 300 as noted herein. The emergency maneuvering instructions may comprise, for each platoon vehicle 302, multiple maneuvers, with each maneuver corresponding to a different scenario and containing instructions with respect to the heading, speed, and steering actuation required in addition to the braking of the vehicle in an emergency scenario. FIGS. 8A and 8B each illustrates two different emergency maneuvering instructions for each platoon vehicle 302, with a different scenario represented in each of the FIGS. 8A and 8B.

FIG. 8A illustrates a first scenario in which a highway shoulder is available. For this scenario, the platoon leader vehicle 302.1 provides instructions for alternate CAVs (the vehicles 302.2 and 302.4) to move to the shoulder and stop, while the other CAVs (the leader vehicle 302.1 and the vehicle 302.3) are instructed to stop without changing lanes. Hence, the inter-vehicle distances are effectively increased, and the rear-end collision probability is reduced significantly.

FIG. 8B illustrates a second scenario in which there is no shoulder. For this scenario, the platoon leader vehicle 302.1 provides instructions for alternate CAVs (the vehicles 302.2 and 302.4) to move to the other lane and exit the vehicle platoon 300, whereas the other CAVs (the leader vehicle 302.1 and the vehicle 302.3) are instructed to stop without changing lanes. In both the scenarios shown in FIG. 8A and FIG. 8B, the follower CAVs still utilize their own sensors and SDM parameters to sense the environment and ensure that moving to the highway shoulder or to the other lane is safe.

SDM-Based Lateral Control of Platoon CAVs

In case of single lane vehicle platoons, a main drawback is that a long train-like platoon may affect traffic flow and the mobility of other vehicles. Also, the communication reliability of farther trailing vehicles with the platoon leader may be adversely affected as the distance between them increases. These issues can be addressed via multi-lane platooning in which a single vehicle platoon may span multiple-lanes with configurable shapes. In such multi-lane platoons, the SDM can be applied to both lateral and longitudinal control systems. Depending on the periodicity of platoon messages and other internal and external factors, the SDM can facilitate the platoon CAVs to safely come close to each other both longitudinally and laterally, resulting in the formation of efficient platoons.

The CACC controller discussed herein may be implemented to control the inter-vehicle spacing in the longitudinal direction between the vehicles 302 travelling in the vehicle platoon and in the same lane. However, one or more (or all) of the vehicles 302 in the vehicle platoon may implement additional or alternate controllers such as a lateral controller as discussed above with reference to FIG. 2. The vehicles 302 may thus implement the lateral controller to maintain a minimum safe lateral distance between one another when the vehicle platoon 300 occupies multiple lanes, and use one or more SDM parameters in accordance with the SDM to do so.

The SDM parameters used by one or more of the vehicles 302 in accordance with their respective SDMs may further include a defined safe lateral distance between a vehicle in one lane (such as vehicles 302.2 and 302.4) and one or more adjacent vehicles in the vehicle platoon 300 that are travelling in a parallel lane (such as the vehicles 302.1 and 302.3). Although this is not shown in FIG. 3, this would represent a two-lane vehicle platoon 300 with the leader vehicle 302.1 in the same lane as the vehicle 302.3, and the vehicles 302.2, 302.4 being in an adjacent parallel lane, with the order from the first vehicle 302.1 to the last vehicle 302.4 being staggered in the order of 302.1, 302.2, 302.3, 302.4.

One of the vehicles (such as vehicle 302.3) in such a configuration may utilize its own lateral controller in accordance with its own SDM to perform lateral control functions. The vehicle 302.3 may thus update its SDM by calculating a safe lateral distance between itself and another vehicle (such as the vehicle 302.4) in the adjacent parallel lane. Again, because such techniques may be combined with the aforementioned techniques as described herein, the SDM parameters used to calculate the minimum safe lateral distance between the vehicle 302.3 and the vehicle 302.4 may be calculated in any suitable manner using a response time parameter, which may be calculated based on the frequency of the platoon messages periodically received from the vehicle 302.4 or any other vehicle 302 in the vehicle platoon 300.

A Process Flow

Figure 9:
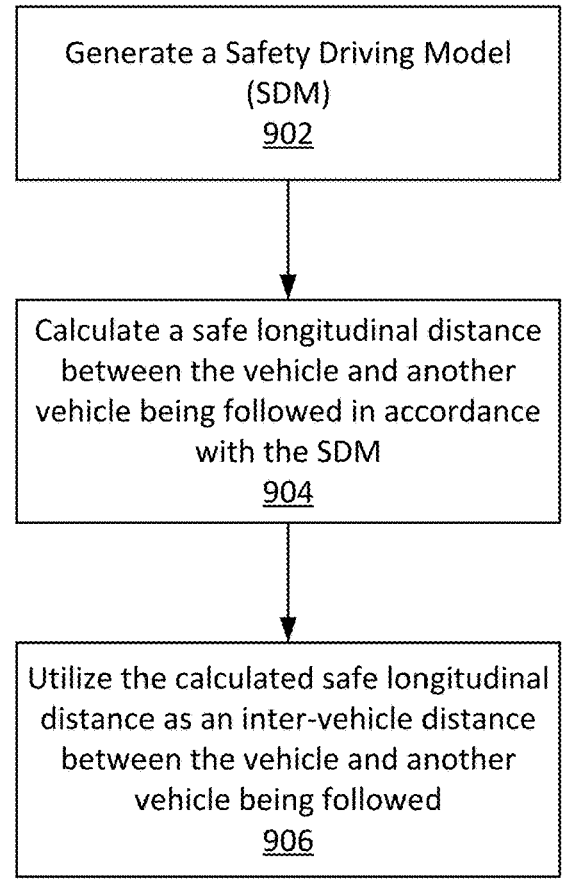
FIG. 9 illustrates a process flow, in accordance with the present disclosure.

FIG. 9 illustrates a process flow. With reference to FIG. 9, the flow 900 may be a computer-implemented method executed by and/or otherwise associated with one or more processors (processing circuitry) and/or storage devices. These processors and/or storage devices may be, for instance, associated with one or more components of a vehicle 302 as discussed herein with reference to FIG. 3. For instance, the processors and/or storage devices may be identified with the one or more processors 102 and/or one or more of the application processors 214A, 214B, image processor 216, communication processor 216, etc., executing computer-readable instructions stored in the memory 202, as shown and described herein with reference to FIG. 2. The one or more processors 102 and/or one or more of the application processors 214A, 214B, image processor 216, communication processor 216, etc. may additionally or alternatively work exclusively as hardware components (processing circuitry or other suitable circuitry), execute instructions stored on other computer-readable storage mediums not shown in the Figures (which may be locally-stored instructions as part of the processing circuitries themselves), and any combination thereof. The various vehicle components used to perform the method 900 may also include other components such as one or more of the wireless transceivers 208, 210, 212, and their accompanying communication interface(s), as discussed herein with reference to FIG. 2 and further below.

The flow 900 may describe an overall operation for a vehicle to utilize various types of parameters to update the vehicle's SDM, which in turn may be used to calculate the inter-vehicle distance in accordance with a CACC-based system for vehicle control when joining, leaving, or travelling within a vehicle platoon, as discussed herein. The flow 900 may include alternate or additional steps that are not shown in FIG. 9 for purposes of brevity, and may be performed in a different order than the steps shown in FIG. 9.

Flow 900 may begin when one or more processors generate (block 902) a SDM that is used by a vehicle to perform control functions using a set of SDM parameters. These SDM parameters may include, among other parameters, a defined safe longitudinal distance between the vehicle (such as the vehicle 302.2) and another vehicle that is being followed (such as the vehicle 302.1). This may include, for instance, the CACC controller of the vehicle calculating the SDM as discussed herein to facilitate vehicle control functions in accordance with a controlled safety framework.

Flow 900 may include one or more processors calculating (block 904) a safe longitudinal distance in accordance with the SDM. This may include the CACC controller of the vehicle calculating the safe longitudinal distance based upon the response time that incorporates the periodicity of received platoon messages, as discussed herein. This may additionally or alternatively include generating (block 904) a kinematics model using various vehicle data and/or environmental data to calculate a maximum acceleration of the vehicle, which is in turn used to calculate the safe longitudinal distance. In any event, the flow 900 includes calculating (block 904) the safe longitudinal distance using the SDM model parameters, such as the evaluation of Equation 2 as noted above, for instance.

Flow 900 may include one or more processors utilizing (block 906) the calculated (block 904) SDM-based longitudinal safe distance as the inter-vehicle distance to be maintained when travelling in a vehicle platoon, as discussed herein. This may include, for instance a vehicle (such as vehicle 302.2) using its CACC controller to calculate, as the inter-vehicle distance in the CACC controlled system in accordance with the various parameters as defined in Equation 1 above, the calculated (block 904) SDM-based longitudinal safe distance.

EXAMPLES

The following examples pertain to various techniques of the present disclosure.

An example (e.g. example 1) relates to a controller of a first vehicle. The controller includes a communication interface configured to periodically receive platoon messages from a second vehicle in a vehicle platoon of the first vehicle; and a Cooperative Adaptive Cruise Control (CACC) controller configured to: generate a safety driving model (SDM) for the first vehicle to perform control functions using first vehicle SDM parameters comprising at least a defined safe longitudinal distance between the first vehicle and the second vehicle, determine the safe longitudinal distance using a response time that incorporates a frequency of the platoon messages periodically received from the second vehicle, and cause the first vehicle to use the determined safe longitudinal distance as an inter-vehicle distance between the first vehicle and the second vehicle in the vehicle platoon.

Another example (e.g. example 2) relates to a previously-described example (e.g. example 1), wherein the response time comprises a summation of (i) communication delays of the platoon messages periodically received from the second vehicle, (ii) planning delays for calculating path planning for the first vehicle, and (iii) actuation delays for controlling the first vehicle.

Another example (e.g. example 3) relates to a previously-described example (e.g. one or more of examples 1-2), wherein the communication interface is configured to receive the platoon messages in accordance with a vehicle-to-everything (V2X) communication protocol.

Another example (e.g. example 4) relates to a previously-described example (e.g. one or more of examples 1-3), wherein the CACC controller is configured to update the SDM when the first vehicle travels in the vehicle platoon with the second vehicle, and to update the safe longitudinal distance between the first vehicle and the second vehicle based on the updated SDM.

Another example (e.g. example 5) relates to a previously-described example (e.g. one or more of examples 1-4), wherein the communication interface is further configured to transmit one or more further platoon messages containing at least a portion of the first vehicle SDM parameters to the second vehicle to cause the second vehicle to transmit, as part of at least one of the periodically received platoon messages, instructions of an organizational change to the vehicle platoon.

Another example (e.g. example 6) relates to a previously-described example (e.g. one or more of examples 1-5), wherein the platoon messages comprise second vehicle SDM parameters that are generated and used by the second vehicle to perform control functions, and wherein the CACC controller is configured to update the SDM for the first vehicle using the second vehicle SDM parameters.

Another example (e.g. example 7) relates to a previously-described example (e.g. one or more of examples 1-6), wherein the first vehicle SDM parameters further comprise a defined safe lateral distance between the first vehicle and a third vehicle in the vehicle platoon parallel with the first vehicle and the second vehicle, and further comprising: a lateral controller configured to utilize the SDM to perform lateral control functions, and to update the first vehicle SDM by determining a safe lateral distance between the first vehicle and the third vehicle based on a frequency of the platoon messages periodically received from the third vehicle.

Another example (e.g. example 8) relates to a previously-described example (e.g. one or more of examples 1-7), wherein: the platoon messages are received from the second vehicle and comprise information of an environment of the vehicle platoon, the communication interface is further configured to transmit additional platoon messages including information of the environment of the vehicle platoon, the first vehicle is a last vehicle in the vehicle platoon, and the second vehicle is a first vehicle in the vehicle platoon.

Another example (e.g. example 9) relates to a previously-described example (e.g. one or more of examples 1-8), wherein the platoon messages are received from the second vehicle including instructions for the first vehicle to execute a predetermined emergency braking maneuver in the vehicle platoon.

An example (e.g. example 10) relates to a controller of a first vehicle. The controller includes a memory configured to store computer-readable instructions; and a Cooperative Adaptive Cruise Control (CACC) controller configured to execute the computer-readable instructions stored in the memory to: generate a safety driving model (SDM) for the first vehicle to perform control functions using first vehicle SDM parameters comprising at least a defined safe longitudinal distance between the first vehicle and a second vehicle in a vehicle platoon of the first vehicle, determine a dynamic kinematics model of movement of the first vehicle, determine an acceleration value of the first vehicle using the dynamic kinematics model, determine the safe longitudinal distance using the acceleration value, and cause the first vehicle to use the determined safe longitudinal distance as an inter-vehicle distance between the first vehicle and the second vehicle in the vehicle platoon.

Another example (e.g. example 11) relates to a previously-described example (e.g. example 10), wherein the CACC controller is configured to determine, as the acceleration value of the first vehicle using the dynamic kinematics model, a maximum acceleration value of the first vehicle.

Another example (e.g. example 12) relates to a previously-described example (e.g. one or more of examples 10-11), wherein the CACC controller is configured to determine the maximum acceleration value of the first vehicle as a function of a currently engaged drive gear of the first vehicle.

Another example (e.g. example 13) relates to a previously-described example (e.g. one or more of examples 10-12), wherein the CACC controller is configured to determine the maximum acceleration value of the first vehicle as a further function of a current speed of the first vehicle.

Another example (e.g. example 14) relates to a previously-described example (e.g. one or more of examples 10-13), wherein the CACC controller is configured to determine the dynamic kinematics model in accordance with a set of kinematic parameters including engine power, engine speed, engine efficiency, a differential gear ratio, a diameter of tractive wheels, and vehicle mass.

Another example (e.g. example 15) relates to a previously-described example (e.g. one or more of examples 10-14), wherein the CACC controller is configured to update the SDM when the first vehicle travels in the vehicle platoon with the second vehicle, and to update the determination of the safe longitudinal distance between the first vehicle and the second vehicle using the updated SDM.

Another example (e.g. example 16) relates to a previously-described example (e.g. one or more of examples 10-15), further comprising: a communication interface configured to transmit one or more first platoon messages containing at least a portion of the first vehicle SDM parameters to the second vehicle to cause the second vehicle to transmit one or more second platoon messages to the first vehicle containing instructions of an organizational change to the vehicle platoon.

Another example (e.g. example 17) relates to a previously-described example (e.g. one or more of examples 10-16), further comprising: a communication interface configured to receive one or more platoon messages transmitted by the second vehicle including at least a portion of second vehicle SDM parameters generated and used by the second vehicle to perform control functions, wherein the CACC controller is configured to update the SDM for the first vehicle using the portion of the second vehicle SDM parameters.

Another example (e.g. example 18) relates to a previously-described example (e.g. one or more of examples 10-17), wherein the first vehicle SDM parameters further comprise a defined safe lateral distance between the first vehicle and a third vehicle in the vehicle platoon parallel with the first vehicle and the second vehicle, and further comprising: a lateral controller configured to utilize the SDM to perform lateral control functions, and to update the SDM for the first vehicle by calculating a safe lateral distance between the first vehicle and the third vehicle based on the frequency of the platoon messages periodically received from the third vehicle.

Another example (e.g. example 19) relates to a previously-described example (e.g. one or more of examples 10-18), further comprising: a communication interface configured to receive one or more platoon messages transmitted by the second vehicle comprising information of an environment of the vehicle platoon, and to transmit additional platoon messages comprising information of the environment of the vehicle platoon, wherein the first vehicle is a last vehicle in the vehicle platoon, and wherein the second vehicle is a first vehicle in the vehicle platoon.

Another example (e.g. example 20) relates to a previously-described example (e.g. one or more of examples 10-19), further comprising: a communication interface configured to receive one or more platoon messages transmitted by the second vehicle comprising instructions for the first vehicle to execute a predetermined emergency braking maneuver in the vehicle platoon.

An example (e.g. example 21) relates to a first vehicle. The first vehicle includes a transceiver configured to periodically receive platoon messages from a second vehicle in a vehicle platoon of the first vehicle; and a controller configured to: generate a safety driving model (SDM) for the first vehicle to perform control functions using first vehicle SDM parameters comprising at least a defined safe longitudinal distance between the first vehicle and the second vehicle, determine the safe longitudinal distance using a response time that incorporates a frequency of the platoon messages periodically received from the second vehicle, and cause the first vehicle to use the determined safe longitudinal distance as an inter-vehicle distance between the first vehicle and the second vehicle in the vehicle platoon.

Another example (e.g. example 22) relates to a previously-described example (e.g. example 21), wherein the transceiver is configured to receive the platoon messages in accordance with a vehicle-to-everything (V2X) communication protocol, and wherein the controller is configured to update the SDM when the first vehicle travels in the vehicle platoon with the second vehicle, and to update the safe longitudinal distance between the first vehicle and the second vehicle based on the updated SDM.

An example (e.g. example 23) relates to a first vehicle. The first vehicle includes a data interface configured to receive vehicle data indicative of a status of the first vehicle; and a controller configured to: generate a safety driving model (SDM) for the first vehicle to perform control functions using first vehicle SDM parameters comprising at least a defined safe longitudinal distance between the first vehicle and a second vehicle in a vehicle platoon of the first vehicle, determine a dynamic kinematics model of movement of the first vehicle using the vehicle data, determine an acceleration value of the first vehicle using the dynamic kinematics model, determine the safe longitudinal distance using the acceleration value, and cause the first vehicle to use the determined safe longitudinal distance as an inter-vehicle distance between the first vehicle and the second vehicle in the vehicle platoon.

Another example (e.g. example 24) relates to a previously-described example (e.g. example 23), wherein the controller is configured to update the SDM when the first vehicle travels in the vehicle platoon with the second vehicle, and to update the determination of the safe longitudinal distance between the first vehicle and the second vehicle using the updated SDM.

An example (e.g. example 25) relates to a controller means for a first vehicle. The controller means includes a communication means for periodically receiving platoon messages from a second vehicle in a vehicle platoon of the first vehicle; and a Cooperative Adaptive Cruise Control (CACC) means for: generating a safety driving model (SDM) for the first vehicle to perform control functions using first vehicle SDM parameters comprising at least a defined safe longitudinal distance between the first vehicle and the second vehicle, determining the safe longitudinal distance using a response time that incorporates a frequency of the platoon messages periodically received from the second vehicle, and causing the first vehicle to use the determined safe longitudinal distance as an inter-vehicle distance between the first vehicle and the second vehicle in the vehicle platoon.

Another example (e.g. example 26) relates to a previously-described example (e.g. example 25), wherein the response time comprises a summation of (i) communication delays of the platoon messages periodically received from the second vehicle, (ii) planning delays for calculating path planning for the first vehicle, and (iii) actuation delays for controlling the first vehicle.

Another example (e.g. example 27) relates to a previously-described example (e.g. one or more of examples 25-26), wherein the communication means receives the platoon messages in accordance with a vehicle-to-everything (V2X) communication protocol.

Another example (e.g. example 28) relates to a previously-described example (e.g. one or more of examples 25-27), wherein the CACC controller means updates the SDM when the first vehicle travels in the vehicle platoon with the second vehicle, and updates the safe longitudinal distance between the first vehicle and the second vehicle based on the updated SDM.

Another example (e.g. example 29) relates to a previously-described example (e.g. one or more of examples 25-28), wherein the communication means transmits one or more further platoon messages containing at least a portion of the first vehicle SDM parameters to the second vehicle to cause the second vehicle to transmit, as part of at least one of the periodically received platoon messages, instructions of an organizational change to the vehicle platoon.

Another example (e.g. example 30) relates to a previously-described example (e.g. one or more of examples 25-29), wherein the platoon messages comprise second vehicle SDM parameters that are generated and used by the second vehicle to perform control functions, and wherein the CACC controller means updates the SDM for the first vehicle using the second vehicle SDM parameters.

Another example (e.g. example 31) relates to a previously-described example (e.g. one or more of examples 25-30), wherein the first vehicle SDM parameters further comprise a defined safe lateral distance between the first vehicle and a third vehicle in the vehicle platoon parallel with the first vehicle and the second vehicle, and further comprising: a lateral controller means for utilizing the SDM to perform lateral control functions, and for updating the first vehicle SDM by determining a safe lateral distance between the first vehicle and the third vehicle based on a frequency of the platoon messages periodically received from the third vehicle.

Another example (e.g. example 32) relates to a previously-described example (e.g. one or more of examples 25-31), wherein: the platoon messages are received from the second vehicle and comprise information of an environment of the vehicle platoon, the communication means further transmits additional platoon messages including information of the environment of the vehicle platoon, the first vehicle is a last vehicle in the vehicle platoon, and the second vehicle is a first vehicle in the vehicle platoon.

Another example (e.g. example 33) relates to a previously-described example (e.g. one or more of examples 25-32), wherein the platoon messages are received from the second vehicle including instructions for the first vehicle to execute a predetermined emergency braking maneuver in the vehicle platoon.

An example (e.g. example 34) relates to a controller means for a first vehicle. The controller means includes a memory means for storing computer-readable instructions; and a Cooperative Adaptive Cruise Control (CACC) controller means for executing the computer-readable instructions stored in the memory to: generate a safety driving model (SDM) for the first vehicle to perform control functions using first vehicle SDM parameters comprising at least a defined safe longitudinal distance between the first vehicle and a second vehicle in a vehicle platoon of the first vehicle, determine a dynamic kinematics model of movement of the first vehicle, determine an acceleration value of the first vehicle using the dynamic kinematics model, determine the safe longitudinal distance using the acceleration value, and cause the first vehicle to use the determined safe longitudinal distance as an inter-vehicle distance between the first vehicle and the second vehicle in the vehicle platoon.

Another example (e.g. example 35) relates to a previously-described example (e.g. example 34), wherein the CACC controller means determines, as the acceleration value of the first vehicle using the dynamic kinematics model, a maximum acceleration value of the first vehicle.

Another example (e.g. example 36) relates to a previously-described example (e.g. one or more of examples 34-35), wherein the CACC controller means determines the maximum acceleration value of the first vehicle as a function of a currently engaged drive gear of the first vehicle.

Another example (e.g. example 37) relates to a previously-described example (e.g. one or more of examples 31-36), wherein the CACC controller means determines the maximum acceleration value of the first vehicle as a further function of a current speed of the first vehicle.

Another example (e.g. example 38) relates to a previously-described example (e.g. one or more of examples 31-37), wherein the CACC controller means determines the dynamic kinematics model in accordance with a set of kinematic parameters including engine power, engine speed, engine efficiency, a differential gear ratio, a diameter of tractive wheels, and vehicle mass.

Another example (e.g. example 39) relates to a previously-described example (e.g. one or more of examples 31-38), wherein the CACC controller means updates the SDM when the first vehicle travels in the vehicle platoon with the second vehicle, and updates the determination of the safe longitudinal distance between the first vehicle and the second vehicle using the updated SDM.

Another example (e.g. example 40) relates to a previously-described example (e.g. one or more of examples 31-39), further comprising: a communication means for transmitting one or more first platoon messages containing at least a portion of the first vehicle SDM parameters to the second vehicle to cause the second vehicle to transmit one or more second platoon messages to the first vehicle containing instructions of an organizational change to the vehicle platoon.

Another example (e.g. example 41) relates to a previously-described example (e.g. one or more of examples 31-40), further comprising: a communication means for receiving one or more platoon messages transmitted by the second vehicle including at least a portion of second vehicle SDM parameters generated and used by the second vehicle to perform control functions, wherein the CACC controller means updates the SDM for the first vehicle using the portion of the second vehicle SDM parameters.

Another example (e.g. example 42) relates to a previously-described example (e.g. one or more of examples 31-41), wherein the first vehicle SDM parameters further comprise a defined safe lateral distance between the first vehicle and a third vehicle in the vehicle platoon parallel with the first vehicle and the second vehicle, and further comprising: a lateral controller means for utilizing the SDM to perform lateral control functions, and for updating the SDM for the first vehicle by calculating a safe lateral distance between the first vehicle and the third vehicle based on the frequency of the platoon messages periodically received from the third vehicle.

Another example (e.g. example 43) relates to a previously-described example (e.g. one or more of examples 31-42), further comprising: a communication means for receiving one or more platoon messages transmitted by the second vehicle comprising information of an environment of the vehicle platoon, and for transmitting additional platoon messages comprising information of the environment of the vehicle platoon, wherein the first vehicle is a last vehicle in the vehicle platoon, and wherein the second vehicle is a first vehicle in the vehicle platoon.

Another example (e.g. example 44) relates to a previously-described example (e.g. one or more of examples 31-43), further comprising: a communication means for receiving one or more platoon messages transmitted by the second vehicle comprising instructions for the first vehicle to execute a predetermined emergency braking maneuver in the vehicle platoon. An example (e.g. example 45) relates to a first vehicle. The first vehicle includes a transceiver means for periodically receiving platoon messages from a second vehicle in a vehicle platoon of the first vehicle; and a controller means for generating a safety driving model (SDM) for the first vehicle to perform control functions using first vehicle SDM parameters comprising at least a defined safe longitudinal distance between the first vehicle and the second vehicle, determining the safe longitudinal distance using a response time that incorporates a frequency of the platoon messages periodically received from the second vehicle, and causing the first vehicle to use the determined safe longitudinal distance as an inter-vehicle distance between the first vehicle and the second vehicle in the vehicle platoon.

Another example (e.g. example 46) relates to a previously-described example (e.g. example 45), wherein the transceiver means receives the platoon messages in accordance with a vehicle-to-everything (V2X) communication protocol, and wherein the controller means updates the SDM when the first vehicle travels in the vehicle platoon with the second vehicle, and updates the safe longitudinal distance between the first vehicle and the second vehicle based on the updated SDM.

An example (e.g. example 47) relates to a first vehicle. The first vehicle includes a data interface means for receiving vehicle data indicative of a status of the first vehicle; and a controller means for: generating a safety driving model (SDM) for the first vehicle to perform control functions using first vehicle SDM parameters comprising at least a defined safe longitudinal distance between the first vehicle and a second vehicle in a vehicle platoon of the first vehicle, determining a dynamic kinematics model of movement of the first vehicle using the vehicle data, determine an acceleration value of the first vehicle using the dynamic kinematics model, determining the safe longitudinal distance using the acceleration value, and causing the first vehicle to use the determined safe longitudinal distance as an inter-vehicle distance between the first vehicle and the second vehicle in the vehicle platoon.

Another example (e.g. example 48) relates to a previously-described example (e.g. example 47), wherein the controller means updates the SDM when the first vehicle travels in the vehicle platoon with the second vehicle, and updates the determination of the safe longitudinal distance between the first vehicle and the second vehicle using the updated SDM.

An apparatus as shown and described.
A method as shown and described.

CONCLUSION

The aforementioned description will so fully reveal the general nature of the implementation of the disclosure that others can, by applying knowledge within the skill of the art, readily modify and/or adapt for various applications such specific implementations without undue experimentation and without departing from the general concept of the present disclosure. Therefore, such adaptations and modifications are intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Each implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

The exemplary implementations described herein are provided for illustrative purposes, and are not limiting. Other implementations are possible, and modifications may be made to the exemplary implementations. Therefore, the specification is not meant to limit the disclosure. Rather, the scope of the disclosure is defined only in accordance with the following claims and their equivalents.

The designs of the disclosure may be implemented in hardware (e.g., circuits), firmware, software, or any combination thereof. Designs may also be implemented as instructions stored on a machine-readable medium, which may be read and executed by one or more processors. A machine-readable medium may include any mechanism for storing or transmitting information in a form readable by a machine (e.g., a computing device). A machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

Throughout the drawings, it should be noted that like reference numbers are used to depict the same or similar elements, features, and structures, unless otherwise noted.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. The terms "group (of)", "set (of)", "collection (of)", "series (of)", "sequence (of)", "grouping (of)", etc., and the like in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The phrase "at least one of" with regard to a group of elements may be used herein to mean at least one element from the group consisting of the elements. The phrase "at least one of" with regard to a group of elements may be used herein to mean a selection of: one of the listed elements, a plurality of one of the listed elements, a plurality of individual listed elements, or a plurality of a multiple of individual listed elements.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned data types and may take various forms and represent any information as understood in the art.

The terms "processor" or "controller" as used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As used herein, "memory" is understood as a computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" refers to any type of executable instruction, including firmware.

In one or more of the implementations described herein, processing circuitry can include memory that stores data and/or instructions. The memory can be any well-known volatile and/or non-volatile memory, including read-only memory (ROM), random access memory (RAM), flash memory, a magnetic storage media, an optical disc, erasable programmable read only memory (EPROM), and programmable read only memory (PROM). The memory can be non-removable, removable, or a combination of both.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). A processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

A "vehicle" may be understood to include any type of driven object. A vehicle may be a driven object with a combustion engine, a reaction engine, an electrically driven object, a hybrid driven object, or a combination thereof. A vehicle may be or may include an automobile, a bus, a mini bus, a van, a truck, a mobile home, a vehicle trailer, a motorcycle, a bicycle, a tricycle, a train locomotive, a train wagon, a moving robot, a personal transporter, a boat, a ship, a submersible, a submarine, a drone, an aircraft, a rocket, and the like.

The term "autonomous vehicle" may describe a vehicle that implements all or substantially all navigational changes, at least during some (significant) part (spatial or temporal, e.g., in certain areas, or when ambient conditions are fair, or on highways, or above or below a certain speed) of some drives. Sometimes an "autonomous vehicle" is distinguished from a "partially autonomous vehicle" or a "semi-autonomous vehicle" to indicate that the vehicle is capable of implementing some (but not all) navigational changes, possibly at certain times, under certain conditions, or in certain areas. A navigational change may describe or include a change in one or more of steering, braking, or acceleration/deceleration of the vehicle. A vehicle may be described as autonomous even in case the vehicle is not fully automatic (fully operational with driver or without driver input). Autonomous vehicles may include those vehicles that can operate under driver control during certain time periods and without driver control during other time periods. Autonomous vehicles may also include vehicles that control only some implementations of vehicle navigation, such as steering (e.g., to maintain a vehicle course between vehicle lane constraints) or some steering operations under certain circumstances (but not under all circumstances), but may leave other implementations of vehicle navigation to the driver (e.g., braking or braking under certain circumstances). Autonomous vehicles may also include vehicles that share the control of one or more implementations of vehicle navigation under certain circumstances (e.g., hands-on, such as responsive to a driver input) and vehicles that control one or more implementations of vehicle navigation under certain circumstances (e.g., hands-off, such as independent of driver input). Autonomous vehicles may also include vehicles that control one or more implementations of vehicle navigation under certain circumstances, such as under certain environmental conditions (e.g., spatial areas, roadway conditions). In some implementations, autonomous vehicles may handle some or all implementations of braking, speed control, velocity control, and/or steering of the vehicle. An autonomous vehicle may include those vehicles that can operate without a driver. The level of autonomy of a vehicle may be described or determined by the Society of Automotive Engineers (SAE) level of the vehicle (as defined by the SAE in SAE J3016 2018: Taxonomy and definitions for terms related to driving automation systems for on road motor vehicles) or by other relevant professional organizations. The SAE level may have a value ranging from a minimum level, e.g. level 0 (illustratively, substantially no driving automation), to a maximum level, e.g. level 5 (illustratively, full driving automation).

What is claimed is:
1. A controller of a first vehicle, comprising:
a communication interface configured to periodically receive platoon messages from a second vehicle in a vehicle platoon of the first vehicle; and
a Cooperative Adaptive Cruise Control (CACC) controller configured to:
generate a safety driving model (SDM) for the first vehicle to perform control functions using first vehicle SDM parameters comprising at least a defined safe longitudinal distance between the first vehicle and the second vehicle;
determine the safe longitudinal distance using a response time that incorporates a frequency of the platoon messages periodically received from the second vehicle; and cause the first vehicle to use the determined safe longitudinal distance as an inter-vehicle distance between the first vehicle and the second vehicle in the vehicle platoon.

2. The controller of claim 1, wherein the response time comprises a summation of (i) communication delays of the platoon messages periodically received from the second vehicle, (ii) planning delays for calculating path planning for the first vehicle, and (iii) actuation delays for controlling the first vehicle.

3. The controller of claim 1, wherein the communication interface is configured to receive the platoon messages in accordance with a vehicle-to-everything (V2X) communication protocol.

4. The controller of claim 1, wherein the CACC controller is configured to update the SDM as the first vehicle travels in the vehicle platoon with the second vehicle, and to update the safe longitudinal distance between the first vehicle and the second vehicle based on the updated SDM.

5. The controller of claim 1, wherein the communication interface is further configured to transmit one or more further platoon messages containing at least a portion of the first vehicle SDM parameters to the second vehicle to cause the second vehicle to transmit, as part of at least one of the periodically received platoon messages, instructions of an organizational change to the vehicle platoon.

6. The controller of claim 1, wherein the platoon messages comprise second vehicle SDM parameters that are generated and used by the second vehicle to perform control functions, and
wherein the CACC controller is configured to update the SDM for the first vehicle using the second vehicle SDM parameters.

7. The controller of claim 1, wherein the first vehicle SDM parameters further comprise a defined safe lateral distance between the first vehicle and a third vehicle in the vehicle platoon that is parallel with the first vehicle and the second vehicle, and further comprising:
a lateral controller configured to utilize the SDM to perform lateral control functions, and to update the first vehicle SDM parameters by determining a safe lateral distance between the first vehicle and the third vehicle based on a frequency of the platoon messages periodically received from the third vehicle.

8. The controller of claim 1, wherein:
the platoon messages received from the second vehicle comprise information of an environment of the vehicle platoon,
the communication interface is further configured to transmit additional platoon messages including information of the environment of the vehicle platoon,
the first vehicle is a last vehicle in the vehicle platoon, and
the second vehicle is a first vehicle in the vehicle platoon.

9. The controller of claim 1, wherein the platoon messages are received from the second vehicle include instructions for the first vehicle to execute a predetermined emergency braking maneuver in the vehicle platoon.

10. A first vehicle, comprising:
a transceiver configured to periodically receive platoon messages from a second vehicle in a vehicle platoon of the first vehicle; and
a controller configured to:
generate a safety driving model (SDM) for the first vehicle to perform control functions using first vehicle SDM parameters comprising at least a defined safe longitudinal distance between the first vehicle and the second vehicle;
determine the safe longitudinal distance using a response time that incorporates a frequency of the platoon messages periodically received from the second vehicle; and
cause the first vehicle to use the determined safe longitudinal distance as an inter-vehicle distance between the first vehicle and the second vehicle in the vehicle platoon.

11. The first vehicle of claim 10, wherein the transceiver is configured to receive the platoon messages in accordance with a vehicle-to-everything (V2X) communication protocol, and
wherein the controller is configured to update the SDM as the first vehicle travels in the vehicle platoon with the second vehicle, and to update the safe longitudinal distance between the first vehicle and the second vehicle based on the updated SDM.

* * * * *